US012585634B2

(12) United States Patent
Huang et al.

(10) Patent No.: US 12,585,634 B2
(45) Date of Patent: Mar. 24, 2026

(54) USING ATOMIC OPERATIONS TO IMPLEMENT A READ-WRITE LOCK

(71) Applicant: NVIDIA Corporation, Santa Clara, CA (US)

(72) Inventors: Zan Huang, Shanghai (CN); Zhen Huang, Guangdong (CN); Xu Guo, Beijing (CN); Lei Wu, Beijing (CN); Kunlun Li, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/671,203

(22) Filed: May 22, 2024

(65) Prior Publication Data

US 2025/0363086 A1 Nov. 27, 2025

(51) Int. Cl.
*G06F 16/23* (2019.01)
*G06F 9/38* (2018.01)

(52) U.S. Cl.
CPC ........ *G06F 16/2343* (2019.01); *G06F 9/3888* (2023.08)

(58) Field of Classification Search
CPC . G06F 16/2343; G06F 16/1774; G06F 9/3888
USPC ........................................ 707/703, 704, 781
See application file for complete search history.

(56) References Cited

U.S. PATENT DOCUMENTS

| | | | | |
|---|---|---|---|---|
| 11,762,711 B2 * | 9/2023 | Dice | .................... | G06F 16/1767 |
| | | | | 718/108 |
| 2007/0079037 A1 * | 4/2007 | Scoredos | ................ | G06F 9/526 |
| | | | | 710/200 |
| 2008/0184249 A1 * | 7/2008 | Adams | ..................... | G06F 9/526 |
| | | | | 718/104 |
| 2015/0286586 A1 * | 10/2015 | Yadav | ..................... | G06F 9/526 |
| | | | | 711/152 |
| 2021/0157830 A1 * | 5/2021 | Chen | ..................... | G06F 3/0683 |

* cited by examiner

*Primary Examiner* — Phong H Nguyen
(74) *Attorney, Agent, or Firm* — Lowenstein Sandler LLP

(57) ABSTRACT

A processing device maintains locking data including a first portion indicating whether a write operation is updating a data item or awaiting to update the data item, and a second portion indicating a number of read operations accessing the data item. A first read operation to the read the data item is received. a first locking condition is determined to be satisfied using the locking data, representing that no write operations are updating the data item or awaiting to update the data item. Responsive to the determination the first locking condition is satisfied, the second portion of the locking data is atomically incremented to reflect the number of read operations reading the data, and the first read operation to read the data is executed.

20 Claims, 15 Drawing Sheets

400

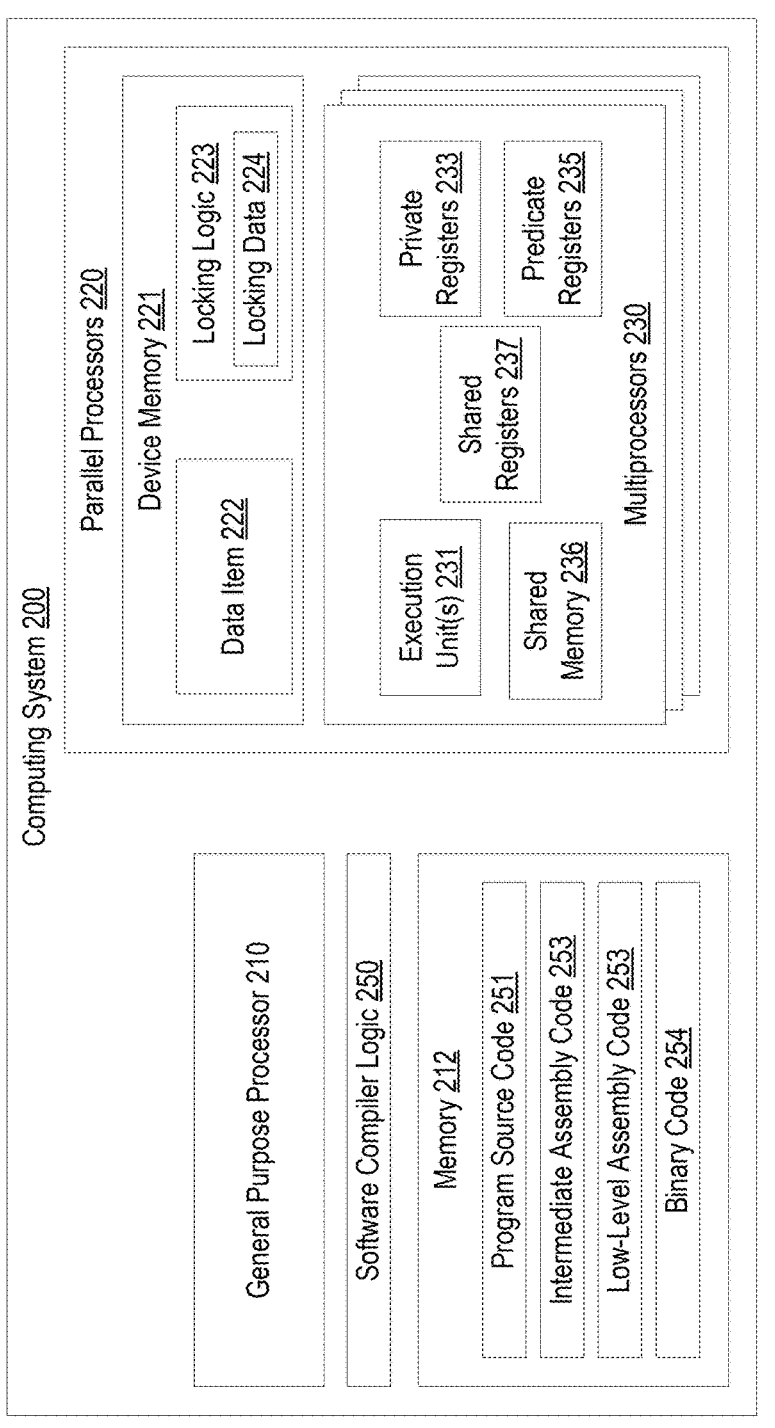
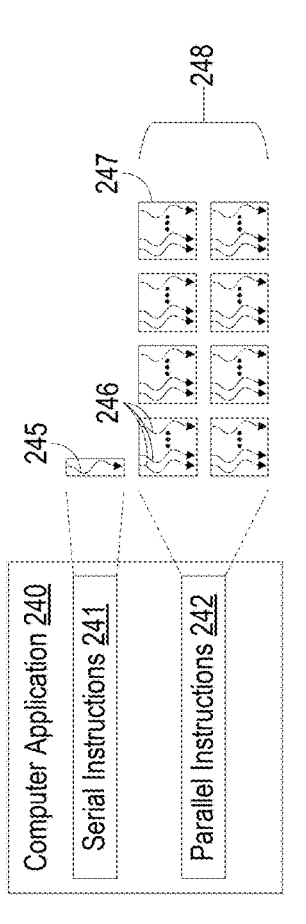
FIG. 2

```
using lock = uint32_t;

#define WRITING_BOUND   0x80000000   // highest bit reserved for the writing flag,
showing the writer is doing the work __device__ void readerAcquireLock(volatile lock& lock) {
    while (atomicCondAdd((unsigned int*)lock, WRITING_BOUND, 1) >=
WRITING_BOUND); // reader only enter critical section if there's no writer doing the
work
}

__device__ void readerReleaseLock(volatile lock& lock) {
    atomicSub((unsigned int*)&(lock), 1); // just decrease the counter, to mark this
reader transaction as finished
}

__device__ void writerAcquireLock(volatile lock& lock) {
    while (atomicCondAdd((unsigned int*)lock, WRITING_BOUND, WRITING_BOUND) >=
WRITING_BOUND); // only one writer allowed to enter critical section at a time,
(optional for HW: it could be another new atomic instruction like atomicAnd/
atomicInc, but just atomicCondAdd would also make it work)
    while (atomicCAS((unsigned int*)(lock), WRITING_BOUND) != WRITING_BOUND)); //
waiting for left readers to finish their work before writing
}

__device__ void writerReleaseLock(volatile lock& lock) {
    atomicExch((unsigned int*)&(lock), 0); // writing done, there should not be
readers as we wait until all read transactions done, so just set it as 0
}
```

FIG. 3

400

Maintain locking data including i) a first portion indicating whether a write operation is updating a data item or awaiting the data item, and ii) a second portion indicating a number of read operations accessing the data item
402

↓

Receive a read operation to read the data item
404

↓

First locking condition satisfied? 406 — NO

YES

↓

Atomically increment the second portion of the locking data to reflect the number of read operations reading the data
408

↓

Execute the read operation to read the data item.
410

↓

Atomically decrement the second portion of the locking data
412

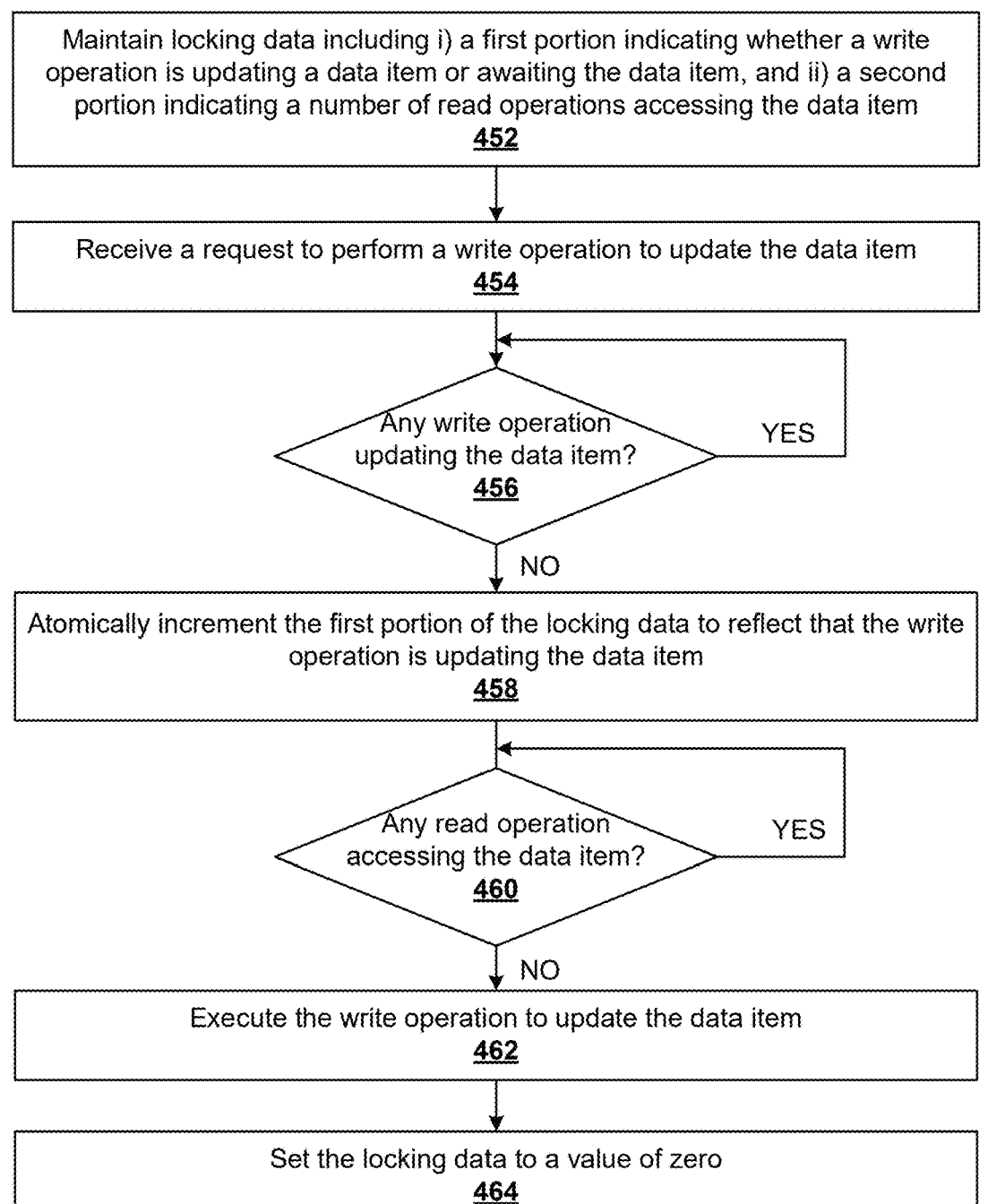

Maintain locking data including i) a first portion indicating whether a write operation is updating a data item or awaiting the data item, and ii) a second portion indicating a number of read operations accessing the data item
452

Receive a request to perform a write operation to update the data item
454

Any write operation updating the data item?
456

YES

NO

Atomically increment the first portion of the locking data to reflect that the write operation is updating the data item
458

Any read operation accessing the data item?
460

YES

NO

Execute the write operation to update the data item
462

Set the locking data to a value of zero
464

FIG. 4B

To/From
XBar

Memory Partition Unit
900

Raster Operations Unit
902

L2 Cache
904

To/From
XBar

Memory Interface
906

To/From
Memory

FROM PIPELINE MANAGER 1232

USING ATOMIC OPERATIONS TO IMPLEMENT A READ-WRITE LOCK

TECHNICAL FIELD

Embodiments of the disclosure generally relate to parallel processing architectures, and more specifically, to improved techniques for utilizing atomic instruction to implement a read-write lock in a single instruction, multiple thread (SIMT) processing architecture.

BACKGROUND

Many computer applications can be accelerated through the use of parallel processing techniques, e.g., where the same instructions can be executed on multiple data elements in parallel. In image and media processing applications, for example, the processing of large sets of pixels, image blocks, and/or vertices can be mapped to different computing threads or processing lanes that can be executed in parallel. For instance, (SIMT) processing architecture, a common instruction (or instruction stream) can be executed using a group of processing threads in parallel.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a block diagram illustrating a computing system, in accordance with at least one embodiment of the present disclosure.

FIG. 3 illustrates example pseudocode to acquire a RW lock using one or more atomic operations, in accordance with at least one embodiment of the present disclosure.

FIG. 4A illustrates example method for a read operation acquiring a RW lock using atomic operations, in accordance with at least one embodiment of the present disclosure.

FIG. 4B illustrates example method for a write operation acquiring a RW lock using atomic operations, in accordance with at least one embodiment of the present disclosure.

DETAILED DESCRIPTION

Figure 1:
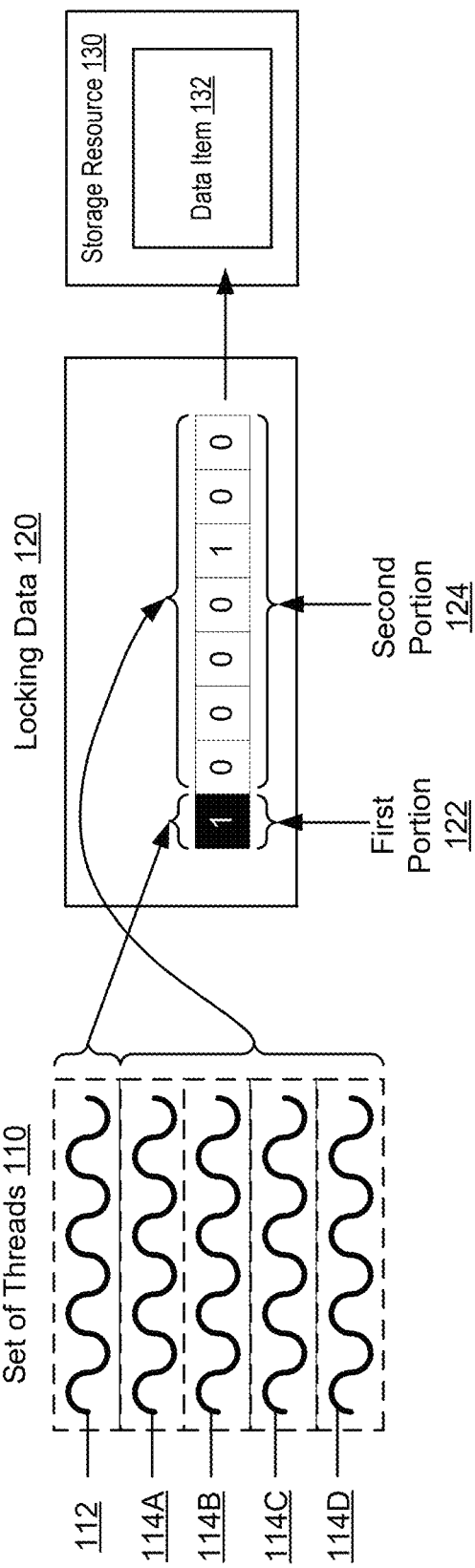
FIG. 1 is an illustrates an example implementation of a read-write (RW) lock, in accordance with at least one embodiment of the present disclosure.

To increase performance, parallel processors (e.g., Parallel Processing Units (PPUs), Graphical Processing Units (GPUs)) typically implement processing techniques such as pipelining that attempt to process, in parallel, as much data as possible throughout the different parts of a parallel processing pipeline. Parallel processors may implement single instruction, multiple thread (SIMT) processing architectures that are designed to maximize the amount of parallel processing in a parallel processing pipeline. In an SIMT processing architecture, groups of parallel threads may execute program instructions synchronously together as often as possible to increase processing efficiency.

At a high level, in a SIMT processing architecture, a common instruction (or instruction stream) can be executed using a group of processing threads in parallel. At a hardware level, the parallel execution of multiple threads is performed using a parallel execution unit, such as an SIMT execution unit (e.g., a specialized functional unit, a texture unit, a load/store unit, etc.). The parallel execution unit, for example, may be able to concurrently perform a variety of different computational operations (e.g., integer and floating-point arithmetic operations, comparison operations, Boolean operations, etc.).

In practice, it is often the case that multiple threads may concurrently attempt to access and/or modify data. A lock is a synchronization mechanism used to enforce limits on access to a given resource, such as data item, a file, memory location, input/output (I/O) port, and the like, usually to ensure that only one thread of execution uses the resource at a time. Some SIMT processing architectures may include atomic operations (e.g., compare-and-swap, test-and-set, etc.) that may be used to implement a spin lock. Atomic operations are low-level operations provided by hardware architecture that allow for thread-safe manipulation of memory locations. For example, a thread can read the state of the lock, acquire the lock, and proceed with its critical section in a single atomic instruction. When another thread attempts to acquire the lock, the thread may repeatably check the lock (e.g., "spin") until the lock becomes available. In a such an implementation, a reader (e.g., a thread) looking to obtain a lock may be blocked by other readers until the lock is released. Such an implementation can result in a reader needlessly acquiring exclusive access to data, wasting computing resources as other readers continuously poll the exclusively held lock, thereby degrading system performance.

A single reader preventing other readers from accessing a shared resource simultaneously can have a significant impact in many systems and services. For example, embedding-based services, such as recommendation systems and large language models (LLMs) may be particularly hindered by increased latency and decreased throughput resulting from readers blocking other readers of shared embeddings. Embeddings are significant within models, particularly in the context of recommendation systems and LLMs. Embeddings, represented as vectors of numbers (e.g., floating-point numbers), capture semantic or contextual information about corresponding words, phrases, or entities and are essential for various operations within these models. There are two primary operations: reading embeddings to generate outputs and updating embeddings to refine the model. Reading operations are frequent, especially for online serving, as they serve many (e.g., millions) users daily. Conversely, updating operations occur periodically (e.g., hourly, daily, etc.), incrementally adjusting embeddings to reflect new data or model improvements. Efficient reading operations are vastly important, given their frequency, while also ensuring that writing operations are completed without interference from reading operations. Because a lock may be acquired and released for a single embedding frequently, the RW lock problem can become more pronounced in these models.

Embodiments of the present disclosure address the above-mentioned limitations and/or other limitations of existing locking mechanisms by providing an atomic instruction to implement a read-write lock (RW lock). RW locks are locks that allow for multiple readers to hold the lock at the same time, while only one writer at a time may hold the lock. A writer looking to obtain a RW lock may block until all readers and another writer has released the lock and, conversely, all readers seeking a RW lock must wait for a writer to release the lock to acquire it. Aspects and implementations of the present disclosure may provide a RW lock using one or more atomic instructions such that read transactions are blocked only by write transactions and race conditions associated with acquiring a lock are eliminated.

In order to provide support for simultaneously access of a shared resource, locking data may be provided to store of lock status of the shared resource. For example, locking data may store a lock status of a particular data item. A first portion of locking data may be used to track and indicate whether a writer is awaiting to write to the data item. A second portion of locking data may be used to track and indicate whether reader is accessing the data item. In at least one embodiment, the locking data may be an integer lock, where the first portion is the most significant bit of the integer lock, and the second portion is the remaining least significant bits of the integer lock.

Aspects and implementations of the present disclosure may provide hardware support for an atomic conditional add operation. The atomic conditional add operation may implement a RW lock by enabling a reader to read the first portion of the integer lock to determine if a writer has acquired the lock (the condition) and increment (the addition) the second portion of the locking integer to reflect the number of readers accessing the shared resource in a single atomic transaction. The reader may await (e.g., spin, loop, etc.) to proceed with the read transaction until the write transaction is finished (first portion of the locking integer is set to '0').

The atomic conditional add operation may similarly enable a writer to read the locking integer to determine if a writer has acquired the lock and increment the first portion of the locking integer to reflect a writer has acquired the lock in a single atomic transaction. Accordingly, the atomic conditional add operation may prevent the writer from acquiring the lock until no other writer has the lock acquired. Once the writer has acquired the lock, the writer may wait (e.g., spin, loop, etc.) to proceed with the write transaction until all readers have finished their respective transactions.

Advantages of the technology disclosure herein include, but are not limited, decreased latency associated with accessing a shared resource as multiple readers are allowed to share a resource simultaneously. Additionally, race conditions associated with assessing and updating a lock, such as a lock integer, can be eliminated as the locking integer can be accessed, compared, and updated in a single atomic transaction. This can be accomplished by implementing a RW lock using an atomic conditional add operation, as described herein.

FIG. 1 is an example implementation of a RW lock, in accordance with aspects and implementations of the present disclosure. FIG. 1 includes a set of threads 110, and locking data 120. Locking data include a first portion 122 and a second portion 124. Set of threads 110 may include threads that execute programmed instructions and may be managed by an operating system, a scheduler, or the like. The threads 110 may be executed concurrently by a computing device that supports multiple processing units. The multiple processing units may be from multiple processors or from a single processor with multicore cores or a combination of both.

In at least one embodiments, the set of threads 110 may be threads executed in parallel on processing cores of a GPU. In at least one embodiment, the set of threads 110 can include threads within a thread block and/or threads across thread blocks. Each thread of the set of threads may have its own context (e.g., program counter, registers, and other state information for execution. In at least one embodiment, threads are organized into groups of threads (also referred to as "warps") herein. Warps are units of thread scheduling and execution where threads within a warp execute in lockstep, allow for efficient SIMT processing.

In order to provide support for multiple threads of set of threads 110 to simultaneously access a shared resource, locking data 120 is provided to store of lock status of a shared resource. For example, locking data 120 may store a lock status of data item 132 stored within a storage resource 130. In some embodiments, locking data may be provided for each addressable location within storage resource 130. In at least one embodiment, locking data may be dedicated to multiple addressable location within storage resource 130. A first portion 122 of locking data 120 may be used to track and indicate whether a thread is awaiting to update (write to) or updating data item 132. A second portion 124 of locking data 120 may be used to track and indicate whether a thread is accessing (reading) data item 132.

In some embodiments, locking data 120 may be a numerical value (e.g., an integer, a decimal, etc.) which may be stored in a binary form. In the example illustrated in FIG. 1, locking data has a binary value of 0b10000100. Portion 122 and portion 124 of locking data 120 may include a different number of bits and evaluate to different values. As illustrated in FIG. 1, first portion 122 includes the most significant bit of locking data 120 and has a binary value of 0b10000000 and second portion 124 includes the 7 least significant bits of locking data 120 with a binary value of 0b00000100. When evaluated as a whole, locking data 120 may evaluate to a numeric value of 132. However, when evaluating portion 122 and portion 124 separately, the first portion 122 evaluates to a numeric value of 128 (or that the first portion 122 has a non-zero value), which may represent a writer (e.g., thread 112) has a acquired a lock on data item 132 and is writing to or waiting to write to data item 132. The second portion 124 evaluates to a numerical value of 4, which may represent that four threads (e.g., threads 114A-115D of set of threads 110) are reading data item 132. In other examples, the first portion 122 may include more than one bit. For example, first portion 122 it may include 4 bits, 8 bits or some other fraction of the word length (e.g., 32 bit or 64 bit) of the computer architecture.

One advantage of maintaining locking data 120 including a first portion 122 and a second portion 124 is that with a single atomic operation, a thread may access the first portion 122 to determine whether a writer (e.g., thread 112) is updating or awaiting to update data item 132 (e.g., first portion 152), access the second portion 124 to determine the number of readers (e.g., threads 114A-D) accessing data item 132, and update the locking data 120. For example, the computer architecture may include hardware support for an atomic conditional add operation. The atomic conditional add operation may implement a RW lock by enabling a reader to perform the following operations in a single atomic transaction: (1) determine that no writer is updating or waiting to update data item 132; (2) increment the second portion 124 of the locking data to reflect the number of readers accessing data item 132; and (3) proceed with the read transaction. Responsive to a determination that a writer is updating or waiting to update data item 132, the reader may await (e.g., spin, loop, etc.) to proceed with the read transaction until the write transaction is finished (first portion 152 is set to '0').

In some embodiments, to determine that no writer is updating or awaiting to update data item 132, the atomic operation may check if the bit of first portion 122 of locking data 120 is set to a binary value of '1.' In some embodiments, to determine that no writer is updating or awaiting to update data item 132, the atomic operation may compare the value of locking data with a specified value. For example, the atomic operation may compare the value of the locking data with the value '132' (e.g., the value of locking data if the first portion 122 is set to a binary value of '1'). If the locking data 120 is less than the specified value, first portion 122 is set to a binary value of '0', representing that no writer is updating or awaiting to update data item 132.

In another example, the atomic conditional add may enable a writer to perform the following operations in single atomic transaction: (1) determine no writer is updating or waiting to update data item (first portion 122 is set to '0'); and (2) increment the first portion 124 of the locking data to represent that a writer is updating or awaiting to update data 132. After succeeding the atomic conditional add, the writer may await (e.g., spin, loop, etc.) to update data 132 until there are no readers accessing data 132 (second portion 124 set to zero). Responsive to a determination that another writer is updating or waiting to update data item 132, the writer may wait (e.g., spin, loop, etc.) until the other writer is finished updating data item 132 (e.g., first portion 122 of locking data 120 set to zero).

An advantage of an atomic operation is that it avoids the risk that a thread accessing multiple portions of data may be interrupted before it can read or modify both portions, for example, a first thread may read first portion 122 and then be interrupted for a duration of time, at which point another thread may modify the second portion 124. When the first thread resumes, it may read the second portion 124 which may no longer be synchronized with the value of the first portion 122 read before interruption. Accordingly, the atomic conditional add operation may be used to implement a thread-safe RW lock.

It is appreciated that the use of 8-bit locking data 120 is used herein by way of example, and not by limitation. In other embodiments, locking data 120 may be any quantity, such as 32 bits, 64 bits or any other larger or smaller number of bits. In at least one embodiment, the quantity of bits may relate to the architecture of the computing system and may correspond to a combination of the hardware capabilities and the software capabilities. In one example, there may be a 32-bit software platform being executed by a 32-bit hardware architecture in which case locking data may be 32 bits. In another example, there may be a 32-bit software platform being executed by a 64-bit hardware architecture, in which case locking data 120 may be 32 bits.

It is appreciated that storage resource 130 is used herein by way of example, and not by way of limitation. Aspects and implementations of the present disclosure may be applied to any physical or virtual resources that are internal or external to a computing device. A physical resource may be any resource associated with a tangible component, such as a piece of hardware. Virtual resources may include logical or abstract representations of physical resources. Virtual resources may include files (e.g., file handles), network connections (e.g., network sockets, bandwidth), processing time, logical memory (e.g., virtual memory), virtual machine resources (e.g., Java Virtual Machine (JVM)), or other similar resources. Internal resources may comprise internal system components, such as memory (e.g., main memory, L1-3 Cache), processing devices (e.g., processors, cores), storage space (e.g., hard disc), network adapter (e.g., WiFi Card, Ethernet card) and other similar tangible resources. External resources may include system resources that are external to the computing device, such as for example, peripheral devices (e.g., external hard drives, display devices or input/output devices).

FIG. 2 is a block diagram illustrating a computing system 200, according to at least one embodiment. In some embodiments, computing system 200 may be a heterogenous computing system that includes one or more types of computational units, including for example, one or more central processing units (CPUs), one or more graphics processing units (GPUs), one or more digital signal processors (DSPs), one or more data processing units (DPUs), one or more field-programmable gate arrays (FPGAs), and/or one or more application specific integrated circuits (ASICs). As illustrated, for instance, computing system 200 may include a general-purpose processor 210 (e.g., a multicore CPU) and a parallel processor 220 (e.g., a general-purpose GPU (GPGPU)).

General purpose processor 210 may be designed for fast serial processing of program instructions, whereas parallel processor(s) 220 may be designed for highly parallel processing of program instructions (e.g., computational instructions). Parallel processor(s) 220 may operate as a coprocessor to the general-purpose processor 210, where portions of a computer application (e.g., data-parallel, compute intensive portions of an application) are off-loaded to the parallel processor 220 for execution.

As an illustrative example, computing system 200 may be used to execute a computer application 240. Computer application 240 may include a collection of program instructions that may include a mix of sequential instruction portions 241, which may be executed as a series of one or more threads 245 on general purpose processor 210, and parallel instruction portions 242, which may be executed in parallel as multiple threads 246 on parallel processor 220. A portion of computer application, for example, may contain programming instructions that are executed many times, but independently on potentially different data, which can be executed as multiple threads 246 on parallel processor 220. The threads 246 may be organized as one or more thread blocks 247 (e.g., as an array or grid 248 of thread blocks 247), which may be concurrently executed by parallel processor 220. In some embodiments, parallel processor 220 may include one or multiprocessors 230, with one or more thread blocks 247 being distributed to each multiprocessor 230 for execution. Individual threads in a thread block 247 can be executed concurrently by multiprocessors 230, and multiprocessors 230 can execute multiple thread blocks concurrently.

In some embodiments, multiprocessors 230 may employ a SIMT (Single-Instruction, Multiple-Thread) architecture for concurrent execution of multiple threads. By way of example, multiprocessors 230 may be configured to create, manage, schedule, and execute threads in groups of parallel threads, which may be referred to as a warp. When multiprocessors 230 are given one or more thread blocks to execute, they may partition them into separate thread groups, which may be independently scheduled for execution.

In some embodiments, multiprocessors 230 may be configured to execute one common instruction for a group of threads at a time (e.g., a warp, half-warp, quarter-warp, etc.). Full efficiency, thus, may be realized when all threads in the group agree on their execution path. Individual threads within a group of threads may start together at a same program address (e.g., a common instruction in a sequence of instructions) but may be assigned their own instruction address counter (or program counter) and register state, allowing each thread to branch and execute independently. If individual threads diverge via a conditional control construct (e.g., a conditional branch, conditional function call, or conditional return), the different branch paths (e.g., resulting from the divergence) may be serially executed. When execution of (e.g., all) branch paths complete, the threads may converge back to the same execution path. In some cases, a program instruction may provide a synchronization point where all threads in the group converge (e.g., where some threads may wait until all threads in the group arrive). Threads in a group of threads that are participating in the current instruction may be referred to as the active threads, whereas threads not on the current instruction may be referred to as inactive (or disabled) threads.

In some embodiments, multiprocessors 230 may include functional execution units that may be configured to perform a variety of operations, including for example, integer and floating-point arithmetic operations (e.g., addition and multiplication), comparison operations, Boolean operations (AND, OR, XOR), bit-shifting operations, random number generation operations, and other computational operations (e.g., planar interpolation and trigonometric, exponential, and logarithmic functions, etc.). In some embodiments, multiprocessors 230 may include one or more execution unit(s) 231. Execution units 231 may be configured to execute a single instruction on multiple sets of data. In some embodiments, execution units 231 may be able to execute a common instruction for each thread in a group of threads (e.g., using a distinct set of source operands and resulting in a distinct set of result operands for each thread).

In some embodiments, multiprocessors 230 may include one or more sets of register files, or registers, for use by the functional execution units of multiprocessors 230. In some embodiments, for example, multiprocessors 230 may include a set of private registers 233 that may provide temporary storage for operands connected to data paths of execution units 231. In some embodiments, private registers 233 may be partitioned and allocated to individual threads in a group of threads being executed by multiprocessors 230, with the allocated portion serving as a private register space of each of the individual threads. In some embodiments, private registers 233 may be statically partitioned (e.g., having a fixed size for each individual thread) and dynamically allocated for use by individual threads. In some embodiments, multiprocessors 230 may include a set of shared registers 237 accessible by some or all threads in a group of threads being executed by multiprocessors 230.

In some embodiments, multiprocessor 230 may include one or more additional sets of registers. In some embodiments, for example, multiprocessor 230 may include a set of special registers that may store predefined, platform-specific information, such as thread parameters (e.g., a thread identifier (within a thread block), lane identifier (within a warp), warp identifier, block identifier, etc.), clock counters, and/or performance monitoring information. In some embodiments, multiprocessor 230 may include a set of predicate registers 235 that may be used to store predicates (e.g., a 1-bit Boolean value), which may be used to support instruction predication (e.g., conditional branch predication). In some embodiments, for example, an instruction may accept an optional predicate guard operand, which if determined to be true, may cause the instruction to be executed and if determined to be false, may preclude execution of the instruction.

In some embodiments, multiprocessors 230 may include a shared memory 236. Shared memory 236 may be allocated to (statically or dynamically) and accessed by some or all threads in a group of threads being executed by multiprocessors 230. In some embodiments, multiprocessors 230 may also be able to access a global memory space, e.g., on a device memory 221 of parallel processor 220, which may be provided to some or all threads in a group of threads being executed by multiprocessors 230.

In some embodiments, computing system 200 may include software compiler logic 250 that may be used to compile a computer application (e.g., computer application 240) from program code, which may be stored in memory 212. Software compiler logic 250, for example, may be used to compile program source code 251 into binary code 254 that may be executed by general purpose processor 210 and/or parallel processor 220. Program source code 251 may include a mix of code, some of which may be designed to execute on general purpose processor 210 ("host code") and some of which may be designed to execute on parallel processor 220 ("device code"). In some embodiments, software compiler logic 250 may operate to separate device code from host code and compile the code separately. Software compiler logic 250, for instance, may compile device source code, e.g., into one or more function kernels, and then modify the host code to include the necessary runtime functional calls to load and launch each compiled function kernel. Software compiler logic 250 may then compile the modified host code to obtain binary code 254, which may be executable by computing system 200 on general purpose processor 210 and parallel processor 220.

In some embodiments, software compiler logic 250 may compile program source code 251, or a portion thereof (e.g., device code in program source code 251), in multiple stages, generating one or more sets of intermediate code (e.g., intermediate assembly code 252 and low-level assembly code 253) before ultimately arriving at binary code 254. Program source code 251, for instance, may be written using a high-level programming language (e.g., C, C++, Java, Python, Fortran, DirectCompute, OpenACC, etc.). Software compiler logic 250 may compile program source code 251 written in a high-level programming language into intermediate assembly code 252 (e.g., parallel-thread-execution (PTX) code, Khronos standard protocol intermediate representation (SPIR) code, low level virtual machine (LLVM) intermediate representation (IR) code, etc.), which may use a particular instruction set architecture (ISA). In some embodiments, intermediate assembly code 252 may use an instruction set suitable for general purpose parallel programming, which may be designed for efficient execution by parallel processors 220. In some embodiments, software compiler logic 250 may compile device code in program source code 251 into an intermediate assembly code 252 that is designed to be architecture independent, so the same code can be used for different parallel processor architectures. In some embodiments, a computer application (or portion thereof) may be directly written as intermediate assembly code 252. In some embodiments, software compiler logic 250 may operate to translate (e.g., further compile) intermediate assembly code into low-level assembly code 253 (e.g., Source and Assembly (SASS) code). Low-level assembly code 253 may use another ISA (e.g., distinct from that of intermediate assembly code 252), which may be a native architecture that uses target-architecture instructions for particular parallel processor architectures. In some embodiments, software compiler logic 250 may use low-level assembly code 253 to generate binary microcode for native execution on a parallel processor 220.

In some embodiments, software compiler logic 250 may operate to generate (e.g., optimized) program code (e.g., intermediate assembly code 252, low-level assembly code 253, or binary code 254), which for example, may improve execution efficiency and resource utilization. Software compiler logic 250, for example, may seek to optimize program code to expose sufficient parallelism, coalesce memory access, ensure coherent execution within a group of threads, etc., which may improve execution of the program code on parallel processor 220 (and multiprocessor 230).

In some embodiments, for example, software compiler logic 250 may operate to perform branch predication (or control flow flattening) to ensure convergent execution of multiple threads (e.g., all threads in a group of threads). In some embodiments, for example, software compiler logic 250 may analyze program code and determine instances where branch predication may be used to implement the code more efficiently. Software compiler logic 250, for instance, may determine when program loops (e.g., for, while, do-while loops) or logic blocks (e.g., if or switch blocks) create branches in the program code that may be cheaper to predicate and execute for all threads (e.g., cheaper than branching the code and serially executing each branch path) and may unroll or flatten these loops or logic blocks. That is, instructions whose execution depends on a conditional control construct (e.g., a conditional branch, conditional function call, or conditional return) are not skipped, but instead are associated with a per-thread condition code, or predicate, that is set to true or false based on the controlling condition. While these instructions may be scheduled for execution by all threads, only those instructions (or threads) with a true predicate value are actually executed. For instructions (or threads) having a false predicate value, addresses may not be evaluated, operands may not be read, and/or results may not be written. Predicating and executing the instruction for all threads may be cheaper. In at least one embodiment, software compiler logic 250 may be used to compile program source code 251 into binary code 254 that may be executed by general purpose processor 210 and/or parallel processor 220 to implement a read/write lock. For example, software compiler logic 250 may compile source code illustrated below with respect to FIG. 3 to acquire/release a RW lock.

In some instances, multiple threads may concurrently attempt to access (e.g., read) and/or update (e.g., write) the same resource, such as a data item 222. Locking logic 223 may use one or more atomic operations to implement a RW lock, as described above with respect to FIG. 1. Locking logic 223 may include locking data to store the lock status for a location within device memory 221 that the data item 222. In at least one embodiment, locking data 224 may include locking data 120 illustrated with respective to FIG. 1, and data item 222 can include data item 132. In at least one embodiment, locking data 120 may be stored and maintained within one or more other memory resources, such as a register file (e.g., private registers 133, predicate register 135, shared registers 237 etc.) or a shared memory (e.g., shared memory 136). For example, a writer (e.g., a thread of threads 246) may request to update/write to data item 222. Locking logic 223 may receive the write request and attempt to acquire a RW lock with respect to data item 222 using one or atomic operations described above with respect to FIG. 1 and below with respect to FIG. 3. Similarly, a reader (e.g., a thread of threads 246) may request to access/read data item 22. Locking logic 223 may receive the read request and attempt to acquire a RW lock with respect to data item 222 using one or more atomic operation described herein.

FIG. 3 illustrates example pseudocode to acquire a RW lock using one or more atomic operations, in accordance with at least one embodiment of the present disclosure. Specifically, the pseudo code includes a function for a reader to acquire a lock, a function for a reader to release a lock, a function for a writer to acquire a lock, and a function for a reader to acquire a lock. The lock (also referred to as "locking data" herein) is declared as an unsigned 32-bit integer that is used to implement a locking mechanism. A first portion (e.g., most significant bit) of lock integer can be indicate whether a writer is accessing a particular data/resource and a second portion (e.g., least significant bits) of the lock integer can be a counter of the number readers accessing the particular data/resource. A "WRITING_BOUND" constant is defined as "0x80000000," with the most significant bit being used a writing flag to determine whether a writer is performing a critical section of code, such as updating a corresponding data item, as described herein.

In at least one embodiment, the illustrated lock acquiring functions may use an atomic conditional add (atomicCondAdd) to implement a lock. Specifically, the atomicCondAdd may provide atomic instruction may perform the following functionality:

$$New = ((old >= val)?\ old:\ (old + 1))$$

The atomic conditional add can include three parameters: (1) an original value (e.g., "old") to be checked and possibly updated, (2) a threshold value (e.g., "val") against which the original value is evaluated, and (3) an increment value (e.g., "1") to be added to the original value responsive to original value satisfying the threshold. The New value is the modified or unmodified original value returned by the operation. For example, the atomic conditional add operation can determine that the original value is less than the threshold value, increment the original value by the increment value, and return the original value in a single atomic transaction. In another example, the atomic conditional add operation can determine that the original value is greater than or equal to the threshold value, and return the original value without incrementing the original value in a single atomic transaction.

In at least one embodiment, the readerAcquireLock function can use the above-described atomicCondAdd atomic operation to acquire a lock on behalf of a reader. For example, the readerAcquireLock function may implement a while loop with an atomicCondAdd atomic operation as a condition of the while loop. The parameters of the atomicCondAdd atomic operation may be the declared integer lock as the original value, the defined WRITING_BOUND as the threshold value, and a value of 1 as the increment value. If the integer lock is less than the WRITING_BOUND, the integer lock is incremented by 1, representing another reader has acquired the lock, and the value of the integer lock is returned. Because the value of the integer lock is less than WRITING_BOUND, the condition of the while loop is not satisfied, and the reader can enter the critical section (e.g., access a corresponding data item). Accordingly, a reader will only acquire a lock if no writer holds the lock.

In at least one embodiment, the readerReleaseLock function can use an atomic subtraction (atomicSub) to release the reader lock. The atomicSub operation may decrement the value of the integer lock by 1, representing that the reader has finished its transaction.

In at least one embodiment, the writerAcquireLock function can use the above-described atomicCondAdd atomic operation to acquire a lock on behalf of a writer. For example, the readerAcquireLock function may implement a while loop with an atomicCondAdd atomic operation as a condition of the while loop. The parameters of the atomicCondAdd atomic operation may be the declared integer lock as the original value, the defined WRITING_BOUND as the threshold value, and an increment value of WRITING_BOUND. If the integer lock is less than the WRITING_BOUND, the integer lock is incremented by the value of WRITING_BOUND, representing the writer has acquired the lock, and the function can proceed to the next while loop. Accordingly, only one writer may acquire the lock and proceed to the next while loop at a time, all other writers will be blocked. At the second while loop, the writer can be wait for remaining readers to finished accesses the shared resource/data before writing to the data. In at least one embodiment, such functionality may be implemented using an atomic compare and swap (CAS) operation. The atomicCAS operation may compare the value of the lock integer with the value WRITING_BOUND. The CAS operation may loop until the value of the integer lock is equivalent to WRITING_BOUND, representing that there are no readers accessing the particular data/resource, and the writer may proceed with updating the data/resource. In at least one embodiment, the functionality of atomicCAS may be provided using another atomic instruction, such as atomicAnd, atomic increment, atomicCondAdd, and the like.

In at least one embodiment, the writerReleaseLock function can be implemented using an atomic exchange (atomicExch) operation to release the writer lock. The atomicExch operation may replace the value of the lock integer with a value of 0, representing that no readers or writers currently hold the lock. In at least one embodiment, functionality of the writerReleaseLock function can be achieved using other atomic operations. For example, writerReleaseLock may be implemented using atomicSub to decrement the lock integer by a value equivalent to WRITING_BOUND.

FIG. 4A illustrates example method 400 for a read operation acquiring a RW lock using atomic operations, in accordance with at least one embodiment of the present disclosure. Although method 400 is described in the context of processing logic, the method 400 may also be performed by a program, custom circuitry, or by a combination of custom circuitry and a program. For example, the method 400 may be executed by a GPU (graphics processing unit), CPU (central processing unit), or any processor. Furthermore, persons of ordinary skill in the art will understand that any system that performs method 400 is within the scope and spirit of embodiments of the present invention.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 402 of method 400, processing logic, such as locking logic 223 of FIG. 2, may maintain locking data including i) a first portion indicating whether a writer operation is updating a data item or awaiting to update the data item, and ii) a second portion indicating a number of read operations accessing the data item. In at least one embodiment, the locking data is an integer including a first set of one or more fields and a second set of one or more fields. For example, the locking data may include locking data 120 with first portion 122 and a second portion 124.

At operation 404 of method 400, processing logic may receive a read operation to read the data item.

At operation 406 of method 400, processing logic may determine using the locking data, whether a first locking condition is satisfied. Satisfying the first locking condition represents that no write operations are updating the data item or awaiting to update the data item. In at least one embodiment, the locking data is an integer, and the first locking condition is satisfied responsive to the integer being less a specified value. For example, the first locking condition may be satisfied responsive to the integer being less than the defined WRITING_BOUND value described with respect to FIG. 3. Responsive to a determination that the first locking condition, method 400 may continue to operation 408. Responsive to a determination that the first locking condition is not satisfied, processing logic may delay execution of the read operation until the first locking condition is satisfied.

At operation 408 of method 400, processing logic may atomically increment the second portion of the locking data to reflect the number of read operations reading the data.

At operation 410 of method 400, processing logic may execute the read operation to read the data item.

At operation 412 of method 400, processing logic may atomically decrement the second portion of the locking data. In at least one embodiment, operation 412 is performed responsive to executed of the read operation at operation 410.

FIG. 4B illustrates example method 450 for a write operation acquiring a RW lock using atomic operations, in accordance with at least one embodiment of the present disclosure. Although method 450 is described in the context of processing logic, the method 450 may also be performed by a program, custom circuitry, or by a combination of custom circuitry and a program. For example, the method 450 may be executed by a GPU (graphics processing unit), CPU (central processing unit), or any processor. Furthermore, persons of ordinary skill in the art will understand that any system that performs method 450 is within the scope and spirit of embodiments of the present invention.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 452 of method 450, processing logic, such as locking logic 223 of FIG. 2, may maintain locking data including i) a first portion indicating whether a writer operation is updating a data item or awaiting to update the data item, and ii) a second portion indicating a number of read operations accessing the data item. In at least one embodiment, the locking data is an integer including a first set of one or more fields and a second set of one or more fields. For example, the locking data may include locking data 120 with first portion 122 and a second portion 124.

At operation 454 of method 450, processing logic receives a request to perform a write operation to update the data item.

At operation 456 of method 450, processing logic may determine whether a write operation is updating the data item or awaiting to update the data item. In at least one embodiment, the processing logic may use the first portion of the locking data to determine whether a write operation is updating the data item. For example, processing logic may determine that no write operation is updating or awaiting to update the data item responsive to a determination that the value of the first portion of the locking data is equivalent to zero or a determination that the locking data is less than a designated value, such as the value of WRITING_BOUND described with respect to FIG. 3. Conversely, processing logic may determine that another write operation is updating or awaiting to update the data item responsive to a determination that the value of the first portion of the locking data is equivalent to one or a determination that the locking data is greater than or equal to a designated value, such as the value of WRITING_BOUND described with respect to FIG. 3. Responsive to a determination that no write operation is updating the data item, method 450 may continue to operation 458.

At operation 458 of method 450, processing logic may atomically update the first portion of locking data to reflect that the first write operation is updating the data item and execute the first operation to update the data item. In at least one embodiment, the processing logic may atomically update the first portion of the locking data using an atomic conditional add operation described above.

At operation 460 of method 450, processing logic determines whether any read operation is accessing the data item. In at least one embodiment, the processing logic may determine whether any read operation is accessing the data item using the locking data. For example, processing logic may determine that the second portion of the locking data is equivalent to a value of zero, indicating that no read operations are accessing the data item. In another example, processing logic may determine that the locking data as is a whole is equivalent to a designated value, such as the value of WRITING_BOUND described with respect to FIG. 3, indicating that no readers are accessing the data item. Responsive to a determination that no read operations are accessing the data item, method 450 may continue to operation 462. In at least one embodiment, the conditions describe with respect to operations 456 and 460 may be merged into a single condition and may generally be referred to as the second locking condition herein. It is appreciated that operations 456 and 460 may combined into a single comparison step or separated into separate operations without deviating from the spirit of the present disclosure.

At operation 462 of method 450, processing logic may execute the write operation to update the data item. In at least one embodiment, responsive to execution of the first write operation to update the date item, processing logic may atomically update the first portion of the locking data to reflect that no write operation is updating the data item or awaiting to update the data item.

At operation 464 of method 450, processing logic may set the locking data to a value of zero. In at least one embodiment, operation 464 is performed responsive to executing the first write operation at operation 462.

In at least one embodiment, the second locking condition may be split into two steps. For example, at a first step, processing logic may determine (using the first portion of the locking data) whether any write operations are accessing the data item. Responsive to a determination that no other write operation is updating the data item, the processing logic may atomically increment the first portion of the locking data to reflect that the write operation is updating the data item. At a second step, processing logic may determine (using the second portion of the locking data) whether any read operations are accessing the data item. For example, the processing logic may determine that the value of the locking data is not equivalent to the defined value of WRITING_BOUND, indicating that a reader is accessing the data item, as described above with respect to FIG. 3. Accordingly, the processing logic may delay execution of the write operation until no read operations are accessing the data item.

Figure 5:
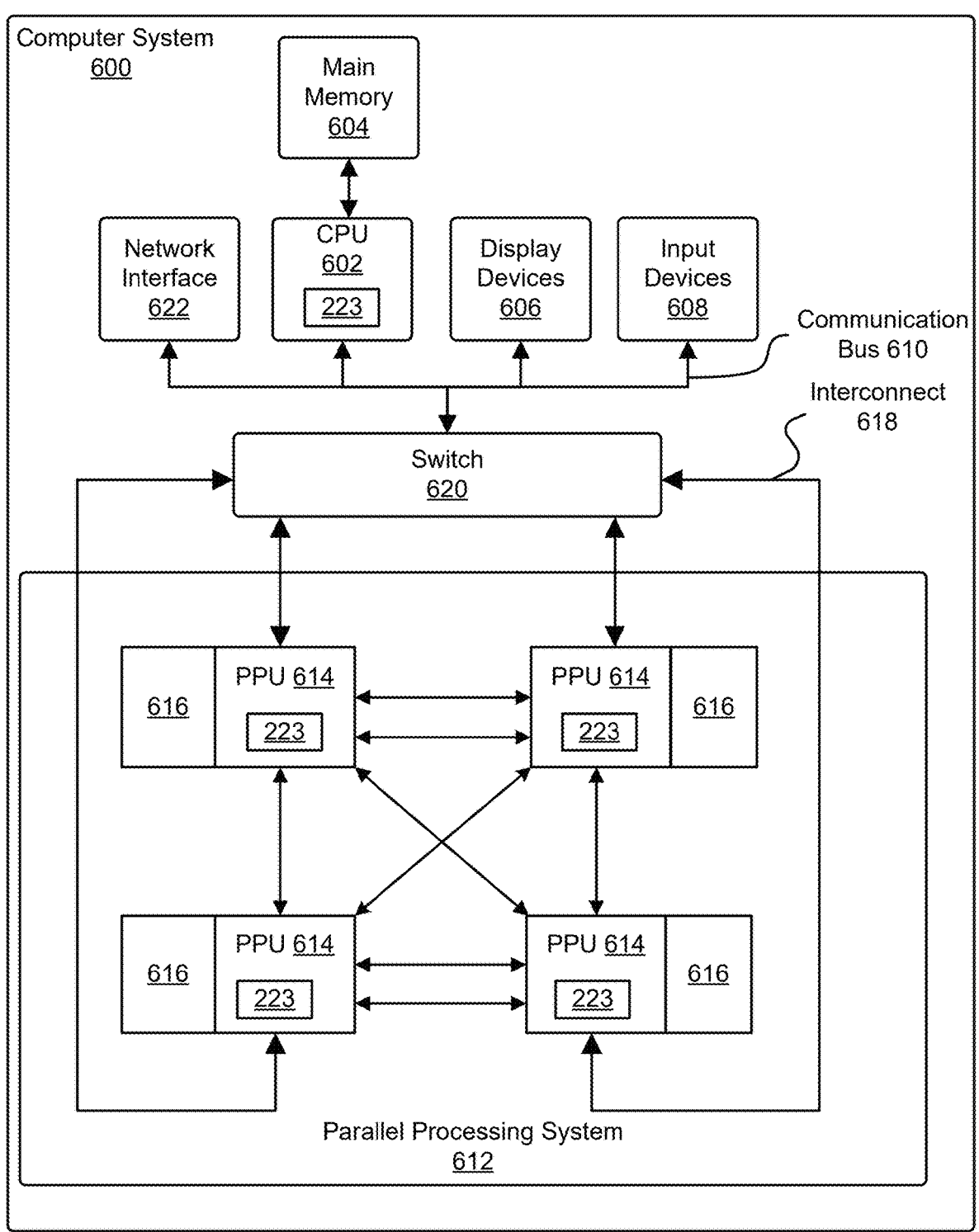
FIG. 5 illustrates a computer system, in accordance with at least one embodiment of the present disclosure.

FIG. 5 illustrates a computer system 500, according to at least one embodiment. In at least one embodiment, computer system 500 is configured to implement various processes and methods described throughout this disclosure.

In at least one embodiment, computer system 500 comprises at least one central processing unit ("CPU") 502 that is connected to a communication bus 510 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 500 includes a main memory 504, which may take form of random-access memory ("RAM"). Control logic (e.g., implemented as hardware, software, or a combination thereof) and data are stored in main memory 504. In at least one embodiment, a network interface subsystem ("network interface") 522 provides an interface to other computing devices and networks for receiving data from and transmitting data to other systems with computer system 500.

In at least one embodiment, computer system 500 includes one or more input devices 508, a parallel processing system 512, and one or more display devices 506 that can be implemented using a conventional cathode ray tube ("CRT"), a liquid crystal display ("LCD"), a light emitting diode ("LED") display, a plasma display, or other suitable display technologies. In at least one embodiment, user input is received from input devices 508 such as keyboard, mouse, touchpad, microphone, etc. In at least one embodiment, each module described herein can be situated on a single semiconductor platform to form a processing system.

Locking logic 223 may be used to perform locking operations associated with one or more embodiments, including atomically updating locking data to implement a RW lock. Details regarding software locking logic 223 are provided herein in conjunction with FIG. 2. In at least one embodiment, locking logic 223 may be used in the system of FIG. 5 for performing locking operations, including atomically updating locking data to implement a RW lock.

In at least one embodiment, computer programs in form of machine-readable executable code or computer control logic algorithms are stored in main memory 504 and/or secondary storage. Computer programs, if executed by one or more processors, enable system 500 to perform various functions in accordance with at least one embodiment. In at least one embodiment, memory 504, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc.

In at least one embodiment, architecture and/or functionality of various previous figures are implemented in the context of CPU 502, parallel processing system 512, an integrated circuit capable of at least a portion of capabilities of both CPU 502 and parallel processing system 512, a chipset (e.g., a group of integrated circuits designed to work and sold as a unit for performing related functions, etc.), and/or any suitable combination of integrated circuit(s). In at least one embodiment, architecture and/or functionality of various previous figures are implemented in the context of a general computer system, a circuit board system, a game console system dedicated for entertainment purposes, an application-specific system, and more. In at least one embodiment, computer system 500 may take the form of a desktop computer, a laptop computer, a tablet computer, a server, a supercomputer, a smart-phone (e.g., a wireless, hand-held device), a personal digital assistant ("PDA"), a digital camera, a vehicle, a head mounted display, a hand-held electronic device, a mobile phone device, a television, a workstation, a game console, an embedded system, and/or any other type of logic device.

In at least one embodiment, parallel processing system 512 includes a plurality of parallel processing units ("PPUs") 514 and associated memories 516. In at least one embodiment, PPUs 514 are connected to a host processor or other peripheral devices via an interconnect 518 and a switch 520 or multiplexer. In at least one embodiment, parallel processing system 512 distributes computational tasks across PPUs 514 which can be parallelizable—for example, as part of distribution of computational tasks across multiple graphics processing unit ("GPU") thread blocks. In at least one embodiment, memory is shared and accessible (e.g., for read and/or write access) across some or all of PPUs 514, although such shared memory may incur performance penalties relative to use of local memory and registers resident to a PPU 514. In at least one embodiment, operation of PPUs 514 is synchronized through use of a command such as _syncthreads( ), wherein all threads in a block (e.g., executed across multiple PPUs 514) to reach a certain point of execution of code before proceeding.

Figure 6:
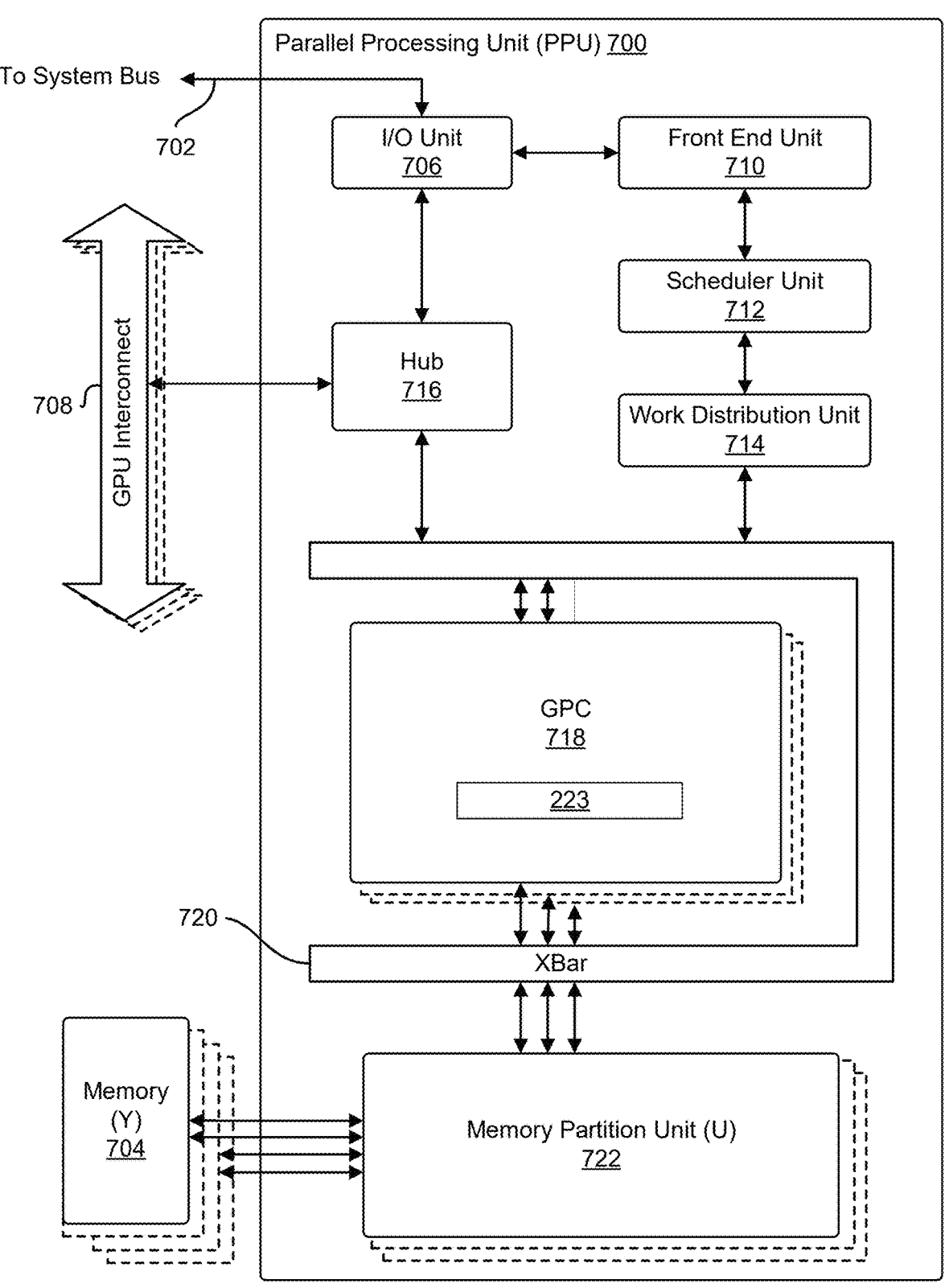
FIG. 6 illustrates a parallel processing unit ("PPU"), in accordance with at least one embodiment of the present disclosure.

FIG. 6 illustrates a parallel processing unit ("PPU") 600, according to at least one embodiment. In at least one embodiment, PPU 600 is configured with machine-readable code that, if executed by PPU 600, causes PPU 600 to perform some or all of processes and techniques described throughout this disclosure. In at least one embodiment, PPU 600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 600. In at least one embodiment, PPU 600 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 600 is utilized to perform computations such as linear algebra operations and machine-learning operations. FIG. 6 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 600 are configured to accelerate High Performance Computing ("HPC"), data center, and machine learning applications. In at least one embodiment, PPU 600 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 600 includes an Input/Output ("I/O") unit 606, a front-end unit 610, a scheduler unit 612, a work distribution unit 614, a hub 616, a crossbar ("XBar") 620, one or more general processing clusters ("GPCs") 618, and one or more partition units ("memory partition units") 622. In at least one embodiment, PPU 600 is connected to a host processor or other PPUs 600 via one or more high-speed GPU interconnects ("GPU interconnects") 608. In at least one embodiment, PPU 600 is connected to a host processor or other peripheral devices via a system bus 602. In at least one embodiment, PPU 600 is connected to a local memory comprising one or more memory devices ("memory") 604. In at least one embodiment, memory devices 604 include one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 608 may refer to a wire-based multi-lane communications link that is used by systems to scale and include one or more PPUs 600 combined with one or more central processing units ("CPUs"), supports cache coherence between PPUs 600 and CPUs, and CPU mastering. In at least one embodiment, data and/or commands are transmitted by high-speed GPU interconnect 608 through hub 616 to/from other units of PPU 600 such as one or more copy engines, video encoders, video decoders, power management units, and other components which may not be explicitly illustrated in FIG. 6.

In at least one embodiment, I/O unit 606 is configured to transmit and receive communications (e.g., commands, data) from a host processor (not illustrated in FIG. 6) over system bus 602. In at least one embodiment, I/O unit 606 communicates with host processor directly via system bus 602 or through one or more intermediate devices such as a memory bridge. In at least one embodiment, I/O unit 606 may communicate with one or more other processors, such as one or more of PPUs 600 via system bus 602. In at least one embodiment, I/O unit 606 implements a Peripheral Component Interconnect Express ("PCIe") interface for communications over a PCIe bus. In at least one embodiment, I/O unit 606 implements interfaces for communicating with external devices.

In at least one embodiment, I/O unit 606 decodes packets received via system bus 602. In at least one embodiment, at least some packets represent commands configured to cause PPU 600 to perform various operations. In at least one embodiment, I/O unit 606 transmits decoded commands to various other units of PPU 600 as specified by commands. In at least one embodiment, commands are transmitted to front-end unit 610 and/or transmitted to hub 616 or other units of PPU 600 such as one or more copy engines, a video encoder, a video decoder, a power management unit, etc. (not explicitly illustrated in FIG. 6). In at least one embodiment, I/O unit 606 is configured to route communications between and among various logical units of PPU 600.

In at least one embodiment, a program executed by host processor encodes a command stream in a buffer that provides workloads to PPU 600 for processing. In at least one embodiment, a workload comprises instructions and data to be processed by those instructions. In at least one embodiment, a buffer is a region in a memory that is accessible (e.g., read/write) by both a host processor and PPU 600—a host interface unit may be configured to access that buffer in a system memory connected to system bus 602 via memory requests transmitted over system bus 602 by I/O unit 606. In at least one embodiment, a host processor writes a command stream to a buffer and then transmits a pointer to a start of a command stream to PPU 600 such that front-end unit 610 receives pointers to one or more command streams and manages one or more command streams, reading commands from command streams and forwarding commands to various units of PPU 600.

In at least one embodiment, front-end unit 610 is coupled to scheduler unit 612 that configures various GPCs 618 to process tasks defined by one or more command streams. In at least one embodiment, scheduler unit 612 is configured to track state information related to various tasks managed by scheduler unit 612 where state information may indicate which of GPCs 618 a task is assigned to, whether task is active or inactive, a priority level associated with task, and so forth. In at least one embodiment, scheduler unit 612 manages execution of a plurality of tasks on one or more of GPCs 618.

In at least one embodiment, scheduler unit 612 is coupled to work distribution unit 614 that is configured to dispatch tasks for execution on GPCs 618. In at least one embodiment, work distribution unit 614 tracks a number of scheduled tasks received from scheduler unit 612 and work distribution unit 614 manages a pending task pool and an active task pool for each of GPCs 618. In at least one embodiment, pending task pool comprises a number of slots (e.g., 32 slots) that contain tasks assigned to be processed by a particular GPC 618; an active task pool may comprise a number of slots (e.g., 4 slots) for tasks that are actively being processed by GPCs 618 such that as one of GPCs 618 completes execution of a task, that task is evicted from that active task pool for GPC 618 and another task from a pending task pool is selected and scheduled for execution on GPC 618. In at least one embodiment, if an active task is idle on GPC 618, such as while waiting for a data dependency to be resolved, then that active task is evicted from GPC 618 and returned to that pending task pool while another task in that pending task pool is selected and scheduled for execution on GPC 618.

In at least one embodiment, work distribution unit 614 communicates with one or more GPCs 618 via XBar 620. In at least one embodiment, XBar 620 is an interconnect network that couples many of units of PPU 600 to other units of PPU 600 and can be configured to couple work distribution unit 614 to a particular GPC 618. In at least one embodiment, one or more other units of PPU 600 may also be connected to XBar 620 via hub 616.

In at least one embodiment, tasks are managed by scheduler unit 612 and dispatched to one of GPCs 618 by work distribution unit 614. In at least one embodiment, GPC 618 is configured to process task and generate results. In at least one embodiment, results may be consumed by other tasks within GPC 618, routed to a different GPC 618 via XBar 620, or stored in memory 604. In at least one embodiment, results can be written to memory 604 via partition units 622, which implement a memory interface for reading and writing data to/from memory 604. In at least one embodiment, results can be transmitted to another PPU 600 or CPU via high-speed GPU interconnect 608. In at least one embodiment, PPU 600 includes a number U of partition units 622 that is equal to a number of separate and distinct memory devices 604 coupled to PPU 600.

In at least one embodiment, a host processor executes a driver kernel that implements an application programming interface ("API") that enables one or more applications executing on a host processor to schedule operations for execution on PPU 600. In at least one embodiment, multiple compute applications are simultaneously executed by PPU 600 and PPU 600 provides isolation, quality of service ("QoS"), and independent address spaces for multiple compute applications. In at least one embodiment, an application generates instructions (e.g., in form of API calls) that cause a driver kernel to generate one or more tasks for execution by PPU 600 and that driver kernel outputs tasks to one or more streams being processed by PPU 600. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory.

Locking logic 223 may be used to perform locking operations associated with one or more embodiments, including atomically updating locking data to implement a RW lock. Details regarding software locking logic 223 are provided herein in conjunction with FIG. 2. In at least one embodiment, locking logic 223 may be used in the system of FIG. 6 for performing locking operations, including atomically updating locking data to implement a RW lock.

Figure 7:
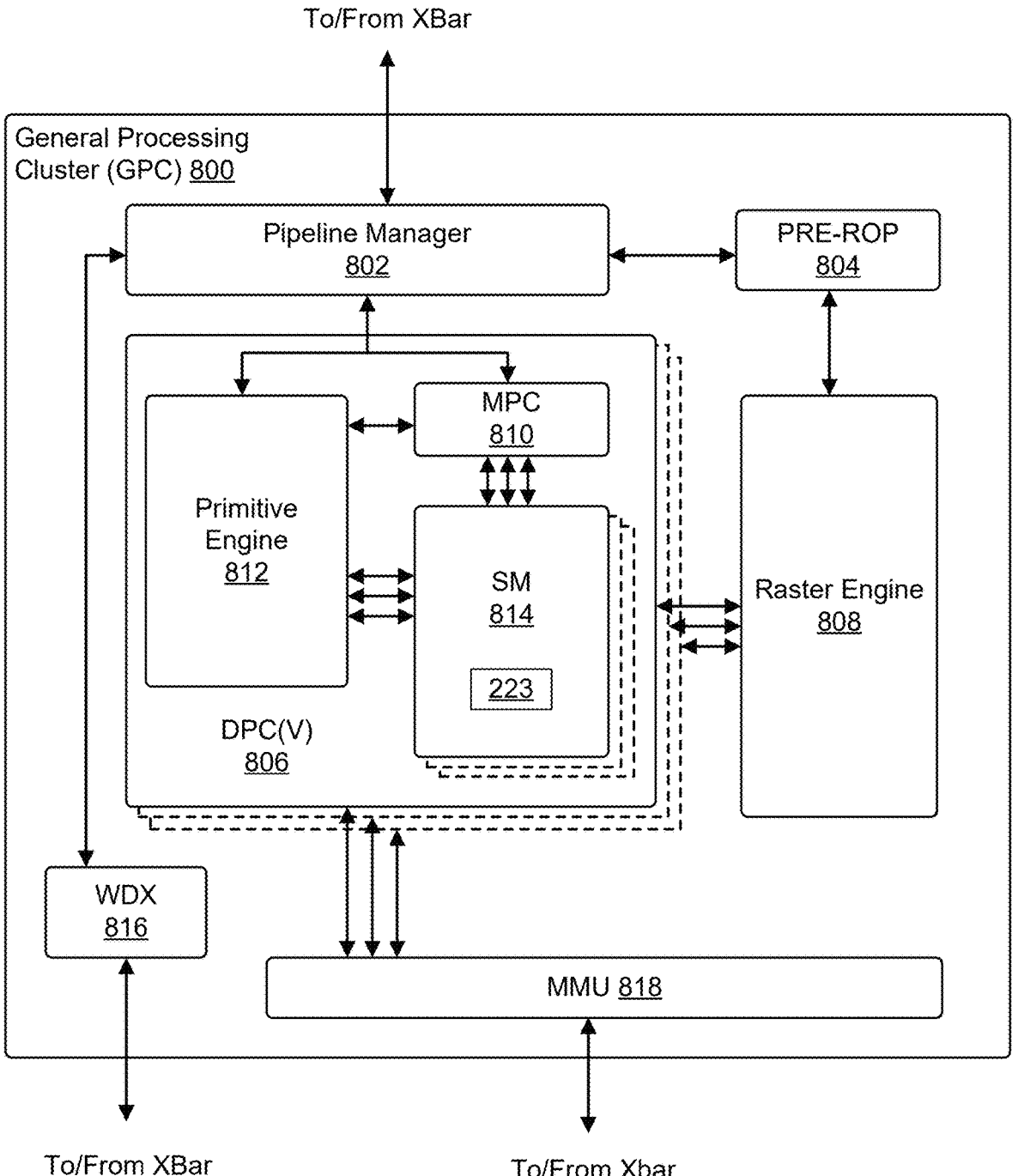
FIG. 7 illustrates a general processing cluster ("GPC"), in accordance with at least one embodiment of the present disclosure.

FIG. 7 illustrates a general processing cluster ("GPC") 700, according to at least one embodiment. In at least one embodiment, GPC 700 is GPC 618 of FIG. 6. In at least one embodiment, each GPC 700 includes a number of hardware units for processing tasks and each GPC 700 includes a pipeline manager 702, a pre-raster operations unit ("preROP") 704, a raster engine 708, a work distribution crossbar ("WDX") 716, a memory management unit ("MMU") 718, one or more Data Processing Clusters ("DPCs") 706, and any suitable combination of parts.

In at least one embodiment, operation of GPC 700 is controlled by pipeline manager 702. In at least one embodiment, pipeline manager 702 manages configuration of one or more DPCs 706 for processing tasks allocated to GPC 700. In at least one embodiment, pipeline manager 702 configures at least one of one or more DPCs 706 to implement at least a portion of a graphics rendering pipeline. In at least one embodiment, Data Processing Cluster (DPC) DPC 706 is configured to execute a vertex shader program on a programmable streaming multi-processor ("SM") 714. In at least one embodiment, pipeline manager 702 is configured to route packets received from a work distribution unit to appropriate logical units within GPC 700, in at least one embodiment, and some packets may be routed to fixed function hardware units in preROP 704 and/or raster engine 708 while other packets may be routed to DPCs 706 for processing by a primitive engine 712 or SM 714. In at least one embodiment, pipeline manager 702 configures at least one of DPCs 706 to implement a neural network model and/or a computing pipeline.

In at least one embodiment, preROP unit 704 is configured, in at least one embodiment, to route data generated by raster engine 708 and DPCs 706 to a Raster Operations ("ROP") unit in partition unit 622, described in more detail above in conjunction with FIG. 6. In at least one embodiment, preROP unit 704 is configured to perform optimizations for color blending, organize pixel data, perform address translations, and more. In at least one embodiment, raster engine 708 includes a number of fixed function hardware units configured to perform various raster operations, in at least one embodiment, and raster engine 708 includes a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 708 comprises fragments to be processed by any suitable entity, such as by a fragment shader implemented within DPC 706.

In at least one embodiment, each DPC 706 included in GPC 700 comprises an M-Pipe Controller ("MPC") 710; primitive engine 712; one or more SMs 714; and any suitable combination thereof. In at least one embodiment, MPC 710 controls operation of DPC 706, routing packets received from pipeline manager 702 to appropriate units in DPC 706. In at least one embodiment, packets associated with a vertex are routed to primitive engine 712, which is configured to fetch vertex attributes associated with a vertex from memory; in contrast, packets associated with a shader program may be transmitted to SM 714.

In at least one embodiment, SM 714 comprises a programmable streaming processor that is configured to process tasks represented by a number of threads. In at least one embodiment, SM 714 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 714 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 714 is described in more detail herein.

In at least one embodiment, MMU 718 provides an interface between GPC 700 and a memory partition unit (e.g., partition unit 622 of FIG. 6) and MMU 718 provides translation of virtual addresses into physical addresses, memory protection, and arbitration of memory requests. In at least one embodiment, MMU 718 provides one or more translation lookaside buffers ("TLBs") for performing translation of virtual addresses into physical addresses in memory.

Locking logic 223 may be used to perform locking operations associated with one or more embodiments, including atomically updating locking data to implement a RW lock. Details regarding software locking logic 223 are provided herein in conjunction with FIG. 2. In at least one embodiment, locking logic 223 may be used in the system of FIG. 7 for performing locking operations, including atomically updating locking data to implement a RW lock.

Figure 8:
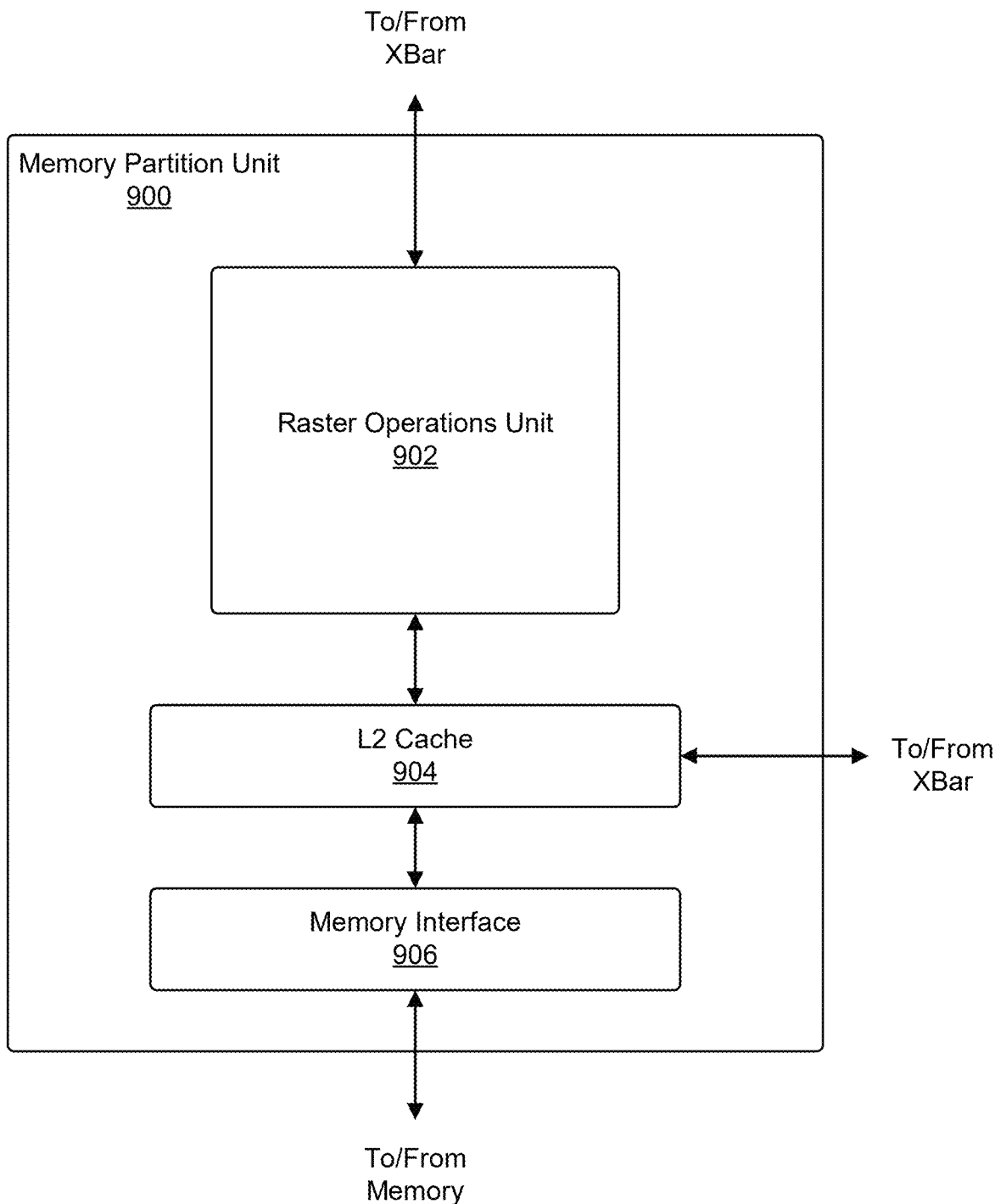
FIG. 8 illustrates a memory partition unit of a parallel processing unit ("PPU"), in accordance with at least one embodiment of the present disclosure.

FIG. 8 illustrates a memory partition unit 800 of a parallel processing unit ("PPU"), in accordance with at least one embodiment. In at least one embodiment, memory partition unit 800 includes a Raster Operations ("ROP") unit 802, a level two ("L2") cache 804, a memory interface 806, and any suitable combination thereof. In at least one embodiment, memory interface 806 is coupled to memory. In at least one embodiment, memory interface 806 may implement 32, 64, 128, 1024-bit data buses, or like, for high-speed data transfer. In at least one embodiment, PPU incorporates U memory interfaces 806 where U is a positive integer, with one memory interface 806 per pair of partition units 800, where each pair of partition units 800 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 806 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 800 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 608 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 800 then services page faults, mapping addresses into page table, after which copy engine performs a transfer. In at least one embodiment, memory is pinned (e.g., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 604 of FIG. 6 or other system memory is fetched by memory partition unit 800 and stored in L2 cache 804, which is located on-chip and is shared between various GPCs, in accordance with at least one embodiment. Each memory partition unit 800, in at least one embodiment, includes at least a portion of L2 cache associated with a corresponding memory device. In at least one embodiment, lower level caches are implemented in various units within GPCs. In at least one embodiment, each of SMs 714 in FIG. 7 may implement a Level 1 ("L1") cache wherein that L1 cache is private memory that is dedicated to a particular SM 714 and data from L2 cache 804 is fetched and stored in each L1 cache for processing in functional units of SMs 714. In at least one embodiment, L2 cache 804 is coupled to memory interface 806 and XBar 620 shown in FIG. 6.

ROP unit 802 performs graphics raster operations related to pixel color, such as color compression, pixel blending, and more, in at least one embodiment. ROP unit 802, in at least one embodiment, implements depth testing in conjunction with raster engine 708, receiving a depth for a sample location associated with a pixel fragment from a culling engine of raster engine 708. In at least one embodiment, depth is tested against a corresponding depth in a depth buffer for a sample location associated with a fragment. In at least one embodiment, if that fragment passes that depth test for that sample location, then ROP unit 802 updates depth buffer and transmits a result of that depth test to raster engine 708. It will be appreciated that a number of partition units 800 may be different than a number of GPCs and, therefore, each ROP unit 802 can, in at least one embodiment, be coupled to each GPC. In at least one embodiment, ROP unit 802 tracks packets received from different GPCs and determines whether a result generated by ROP unit 802 is to be routed to through XBar 620.

Figure 9:
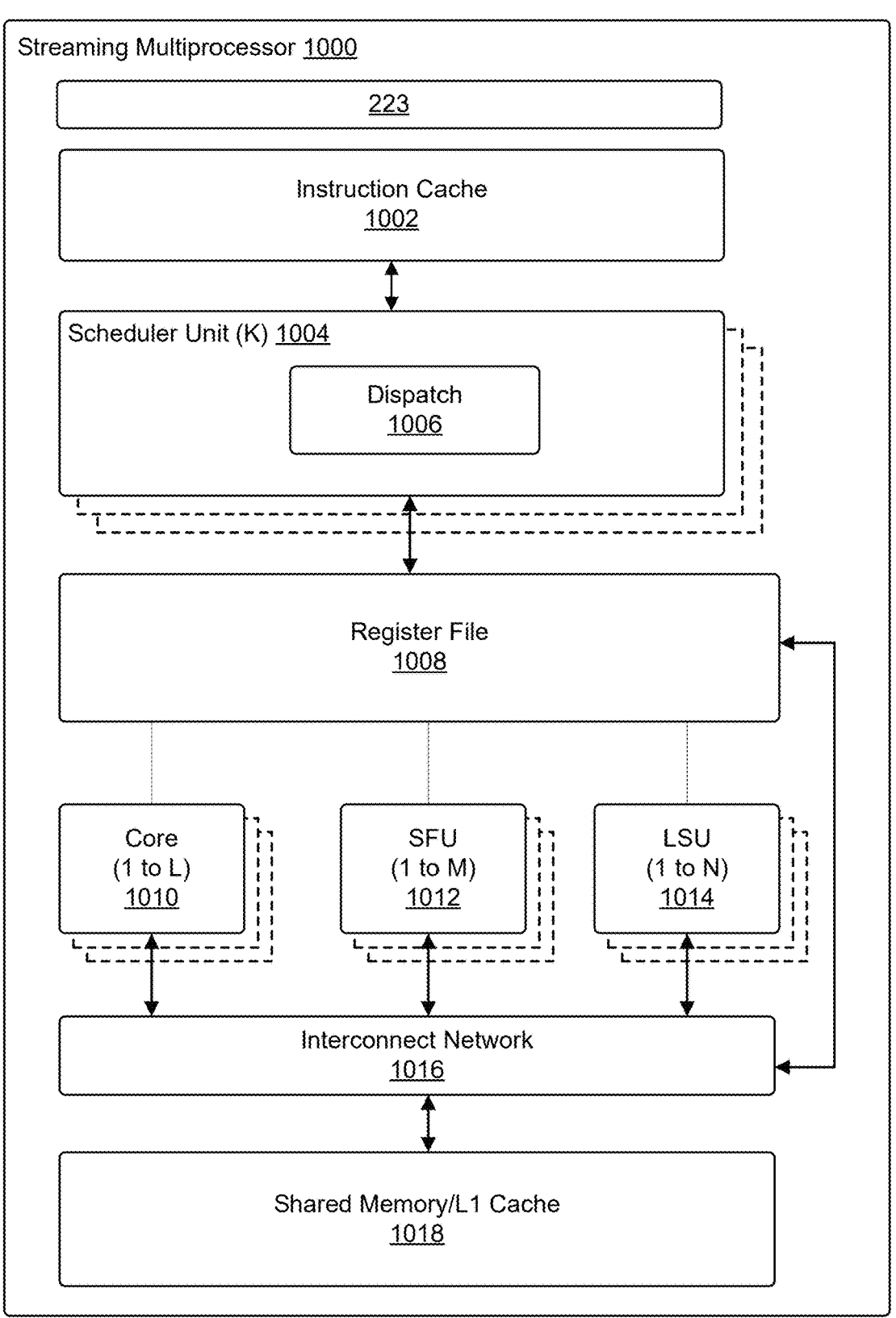
FIG. 9 illustrates a streaming multi-processor, in accordance with at least one embodiment of the present disclosure.

FIG. 9 illustrates a streaming multi-processor ("SM") 900, according to at least one embodiment. In at least one embodiment, SM 900 is SM of FIG. 7. In at least one embodiment, SM 900 includes an instruction cache 902, one or more scheduler units 904, a register 908, one or more processing cores ("cores") 910, one or more special function units ("SFUs") 912, one or more load/store units ("LSUs") 914, an interconnect network 916, a shared memory/level one ("L1") cache 918, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 900. In at least one embodiment, scheduler unit 904 receives tasks from a work distribution unit and manages instruction scheduling for one or more thread blocks assigned to SM 900. In at least one embodiment, scheduler unit 904 schedules thread blocks for execution as warps of parallel threads, wherein each thread block is allocated at least one warp. In at least one embodiment, each warp executes threads. In at least one embodiment, scheduler unit 904 manages a plurality of different thread blocks, allocating warps to different thread blocks and then dispatching instructions from plurality of different cooperative groups to various functional units (e.g., processing cores 810, SFUs 812, and LSUs 814) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads ( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (e.g., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including producer-consumer parallelism, opportunistic parallelism, and global synchronization across an entire grid of thread blocks.

In at least one embodiment, a dispatch unit 906 is configured to transmit instructions to one or more functional units and scheduler unit 904 and includes two dispatch units 906 that enable two different instructions from a common warp to be dispatched during each clock cycle. In at least one embodiment, each scheduler unit 904 includes a single dispatch unit 906 or additional dispatch units 906.

In at least one embodiment, each SM 900, in at least one embodiment, includes register 908 that provides a set of registers for functional units of SM 900. In at least one embodiment, register 908 is divided between each functional unit such that each functional unit is allocated a dedicated portion of register 908. In at least one embodiment, register 908 is divided between different warps being executed by SM 900 and register 908 provides temporary storage for operands connected to data paths of functional units. In at least one embodiment, each SM 900 comprises a plurality of L processing cores 910, where L is a positive integer. In at least one embodiment, SM 900 includes a large number (e.g., 128 or more) of distinct processing cores 910. In at least one embodiment, each processing core 910 includes a fully-pipelined, single-precision, double-precision, and/or mixed precision processing unit that includes a floating point arithmetic logic unit and an integer arithmetic logic unit. In at least one embodiment, floating point arithmetic logic units implement IEEE 754-2008 standard for floating point arithmetic. In at least one embodiment, processing cores 910 include 64 single-precision (32-bit) floating-point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 910. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 900 comprises M SFUs 912 that perform special functions (e.g., attribute evaluation, reciprocal square root, and like). In at least one embodiment, SFUs 912 include a tree traversal unit configured to traverse a hierarchical tree data structure. In at least one embodiment, SFUs 912 include a texture unit configured to perform texture map filtering operations. In at least one embodiment, texture units are configured to load texture maps (e.g., a 2D array of texels) from memory and sample texture maps to produce sampled texture values for use in shader programs executed by SM 900. In at least one embodiment, texture maps are stored in shared memory/L1 cache 918. In at least one embodiment, texture units implement texture operations such as filtering operations using mip-maps (e.g., texture maps of varying levels of detail), in accordance with at least one embodiment. In at least one embodiment, each SM 900 includes two texture units.

Each SM 900 comprises N LSUs 914 that implement load and store operations between shared memory/L1 cache 918 and register 908, in at least one embodiment. Interconnect network 916 connects each functional unit to register 908 and LSU 914 to register 908 and shared memory/L1 cache 918 in at least one embodiment. In at least one embodiment, interconnect network 916 is a crossbar that can be configured to connect any functional units to any registers in register 908 and connect LSUs 914 to register 908 and memory locations in shared memory/L1 cache 918.

In at least one embodiment, shared memory/L1 cache 918 is an array of on-chip memory that allows for data storage and communication between SM 900 and primitive engine and between threads in SM 900, in at least one embodiment. In at least one embodiment, shared memory/L1 cache 918 comprises 128 KB of storage capacity and is in a path from SM 900 to a partition unit. In at least one embodiment, shared memory/L1 cache 918, in at least one embodiment, is used to cache reads and writes. In at least one embodiment, one or more of shared memory/L1 cache 918, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 918 enables shared memory/L1 cache 918 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 900 to execute program and perform calculations, shared memory/L1 cache 918 to communicate between threads, and LSU 914 to read and write global memory through shared memory/L1 cache 918 and memory partition unit. In at least one embodiment, when configured for general purpose parallel computation, SM 900 writes commands that scheduler unit 904 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Locking logic 223 may be used to perform locking operations associated with one or more embodiments, including atomically updating locking data to implement a RW lock. Details regarding software locking logic 223 are provided herein in conjunction with FIG. 2. In at least one embodiment, locking logic 223 may be used in the system of FIG. 9 for performing locking operations, including atomically updating locking data to implement a RW lock.

Figure 10:
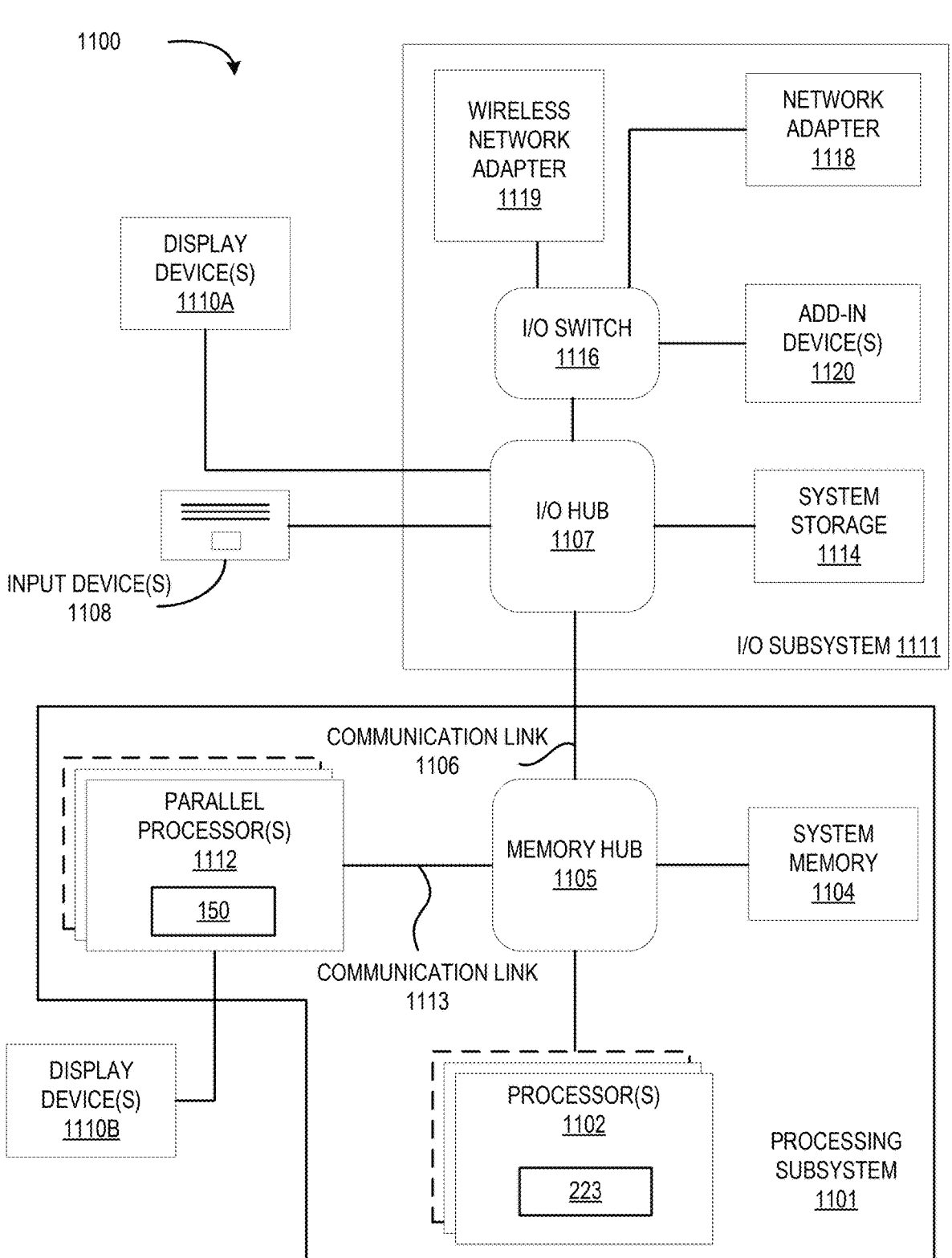
FIG. 10 illustrates a computer system, in accordance with at least one embodiment of the present disclosure.

FIG. 10 is a block diagram illustrating a computing system 1000 according to at least one embodiment. In at least one embodiment, computing system 1000 includes a processing subsystem 1001 having one or more processor(s) 1002 and a system memory 1004 communicating via an interconnection path that may include a memory hub 1005. In at least one embodiment, memory hub 1005 may be a separate component within a chipset component or may be integrated within one or more processor(s) 1002. In at least one embodiment, memory hub 1005 couples with an I/O subsystem 1011 via a communication link 1006. In at least one embodiment, I/O subsystem 1011 includes an I/O hub 1007 that can enable computing system 1000 to receive input from one or more input device(s) 1008. In at least one embodiment, I/O hub 1007 can enable a display controller, which may be included in one or more processor(s) 1002, to provide outputs to one or more display device(s) 1010A. In at least one embodiment, one or more display device(s) 1010A coupled with I/O hub 1007 can include a local, internal, or embedded display device.

In at least one embodiment, processing subsystem 1001 includes one or more parallel processor(s) 1012 coupled to memory hub 1005 via a bus or other communication link 1013. In at least one embodiment, communication link 1013 may use one of any number of standards based communication link technologies or protocols, such as, but not limited to PCI Express, or may be a vendor-specific communications interface or communications fabric. In at least one embodiment, one or more parallel processor(s) 1012 form a computationally focused parallel or vector processing system that can include a large number of processing cores and/or processing clusters, such as a many-integrated core (MIC) processor. In at least one embodiment, some or all of parallel processor(s) 1012 form a graphics processing subsystem that can output pixels to one of one or more display device(s) 1010A coupled via I/O Hub 1007. In at least one embodiment, parallel processor(s) 1012 can also include a display controller and display interface (not shown) to enable a direct connection to one or more display device(s) 1010B.

In at least one embodiment, a system storage unit 1014 can connect to I/O hub 1007 to provide a storage mechanism for computing system 1000. In at least one embodiment, an I/O switch 1016 can be used to provide an interface mechanism to enable connections between I/O hub 1007 and other components, such as a network adapter 1018 and/or a wireless network adapter 1019 that may be integrated into platform, and various other devices that can be added via one or more add-in device(s) 1020. In at least one embodiment, network adapter 1018 can be an Ethernet adapter or another wired network adapter. In at least one embodiment, wireless network adapter 1019 can include one or more of a Wi-Fi, Bluetooth, near field communication (NFC), or other network device that includes one or more wireless radios.

In at least one embodiment, computing system 1000 can include other components not explicitly shown, including USB or other port connections, optical storage drives, video capture devices, and like, may also be connected to I/O hub 1007. In at least one embodiment, communication paths interconnecting various components in FIG. 10 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1012 incorporate circuitry optimized for graphics and video processing, including, for example, video output circuitry, and constitutes a graphics processing unit (GPU). In at least one embodiment, parallel processor(s) 1012 incorporate circuitry optimized for general purpose processing. In at least one embodiment, components of computing system 1000 may be integrated with one or more other system elements on a single integrated circuit. For example, in at least one embodiment, parallel processor(s) 1012, memory hub 1005, processor(s) 1002, and I/O hub 1007 can be integrated into a system on chip (SoC) integrated circuit. In at least one embodiment, components of computing system 1000 can be integrated into a single package to form a system in package (SIP) configuration. In at least one embodiment, at least a portion of components of computing system 1000 can be integrated into a multi-chip module (MCM), which can be interconnected with other multi-chip modules into a modular computing system.

Locking logic 223 may be used to perform locking operations associated with one or more embodiments, including atomically updating locking data to implement a RW lock. Details regarding software locking logic 223 are provided herein in conjunction with FIG. 2. In at least one embodiment, locking logic 223 may be used in the system of FIG. 10 for performing locking operations, including atomically updating locking data to implement a RW lock.

Figure 11A:
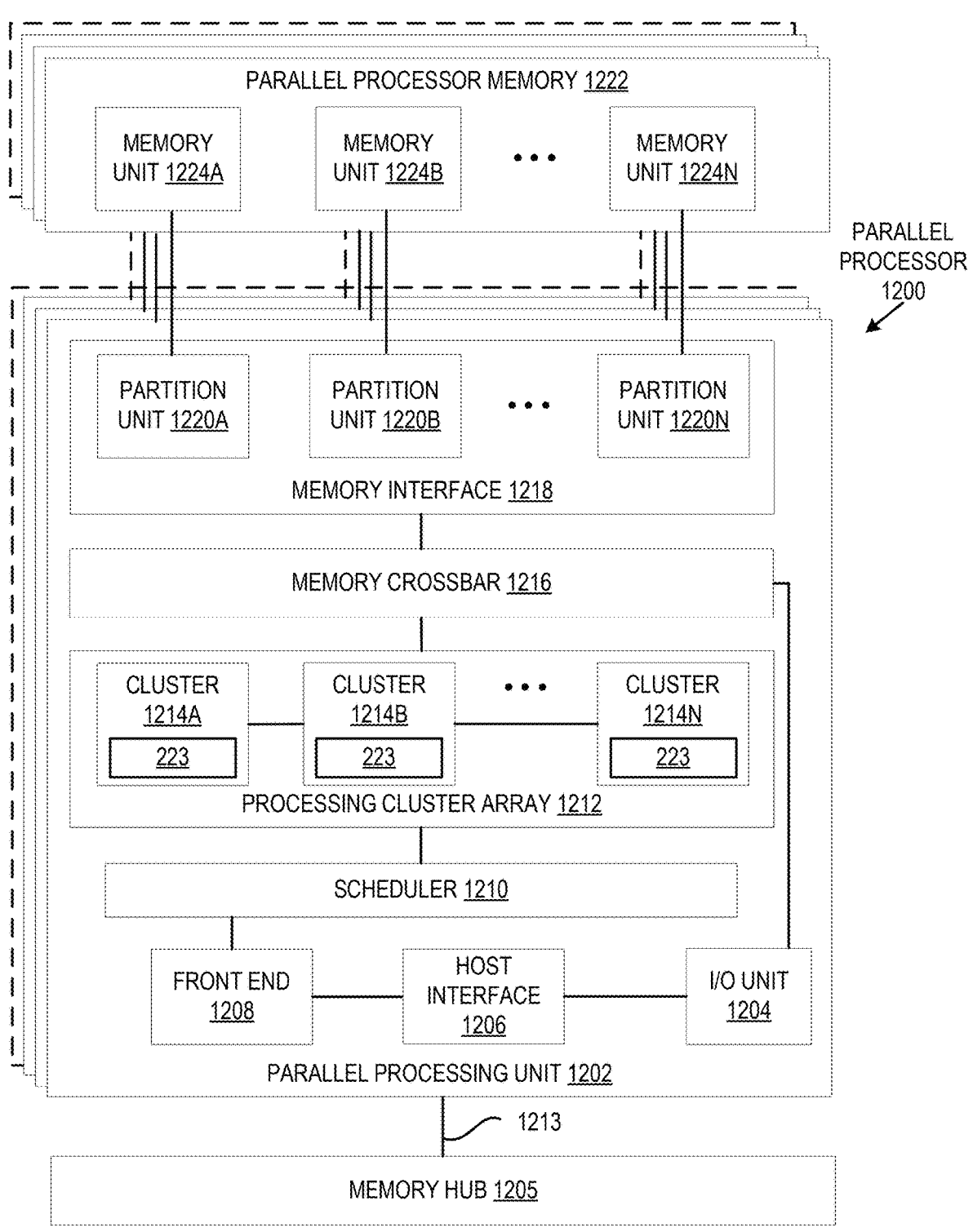
FIG. 11A illustrates a parallel processor, in accordance with at least one embodiment of the present disclosure.

FIG. 11A illustrates a parallel processor 1100 according to at least one embodiment. In at least one embodiment, various components of parallel processor 1100 may be implemented using one or more integrated circuit devices, such as programmable processors, application specific integrated circuits (ASICs), or field programmable gate arrays (FPGA). In at least one embodiment, illustrated parallel processor 1100 is a variant of the one or more parallel processor(s) 1012 shown in FIG. 10.

In at least one embodiment, parallel processor 1100 includes a parallel processing unit 1102. In at least one embodiment, parallel processing unit 1102 includes an I/O unit 1104 that enables communication with other devices, including other instances of parallel processing unit 1102. In at least one embodiment, I/O unit 1104 may be directly connected to other devices. In at least one embodiment, I/O unit 1104 connects with other devices via use of a hub or switch interface, such as a memory hub 1105. In at least one embodiment, connections between memory hub 1105 and I/O unit 1104 form a communication link 1113. In at least one embodiment, I/O unit 1104 connects with a host interface 1106 and a memory crossbar 1116, where host interface 1106 receives commands directed to performing processing operations and memory crossbar 1116 receives commands directed to performing memory operations.

In at least one embodiment, when host interface 1106 receives a command buffer via I/O unit 1104, host interface 1106 can direct operations to perform those commands to a front end 1108. In at least one embodiment, front end 1108 couples with a scheduler 1110, which is configured to distribute commands or other work items to a processing cluster array 1112. In at least one embodiment, scheduler 1111 ensures that processing cluster array 1112 is properly configured and in a valid state before tasks are distributed to a cluster of processing cluster array 1112. In at least one embodiment, scheduler 1110 is implemented via firmware logic executing on a microcontroller. In at least one embodiment, microcontroller implemented scheduler 1110 is configurable to perform complex scheduling and work distribution operations at coarse and fine granularity, e.g., enabling rapid preemption and context switching of threads executing on processing array 1112. In at least one embodiment, host software can prove workloads for scheduling on processing cluster array 1112 via one of multiple graphics processing paths. In at least one embodiment, workloads can then be automatically distributed across processing array cluster 1112 by scheduler 1110 logic within a microcontroller including scheduler 1110.

In at least one embodiment, processing cluster array 1112 can include up to "N" processing clusters (e.g., cluster 1114A, cluster 1114B, through cluster 1114N), where "N" represents a positive integer (which may be a different integer "N" than used in other figures). In at least one embodiment, each cluster 1114A-1114N of processing cluster array 1112 can execute a large number of concurrent threads. In at least one embodiment, scheduler 1110 can allocate work to clusters 1114A-1114N of processing cluster array 1112 using various scheduling and/or work distribution algorithms, which may vary depending on workload arising for each type of program or computation. In at least one embodiment, scheduling can be handled dynamically by scheduler 1110, or can be assisted in part by compiler logic during compilation of program logic configured for execution by processing cluster array 1112. In at least one embodiment, different clusters 1114A-1114N of processing cluster array 1112 can be allocated for processing different types of programs or for performing different types of computations.

In at least one embodiment, processing cluster array 1112 can be configured to perform various types of parallel processing operations. In at least one embodiment, processing cluster array 1112 is configured to perform general-purpose parallel compute operations. For example, in at least one embodiment, processing cluster array 1112 can include logic to execute processing tasks including filtering of video and/or audio data, performing modeling operations, including physics operations, and performing data transformations.

In at least one embodiment, processing cluster array 1112 is configured to perform parallel graphics processing operations. In at least one embodiment, processing cluster array 1112 can include additional logic to support execution of such graphics processing operations, including but not limited to, texture sampling logic to perform texture operations, as well as tessellation logic and other vertex processing logic. In at least one embodiment, processing cluster array 1112 can be configured to execute graphics processing related shader programs, for example, such as vertex shaders, tessellation shaders, geometry shaders, and pixel shaders. In at least one embodiment, parallel processing unit 1102 can transfer data from system memory via I/O unit 1104 for processing. In at least one embodiment, during processing, transferred data can be stored to on-chip memory (e.g., parallel processor memory 1122) during processing, then written back to system memory.

In at least one embodiment, when parallel processing unit 1102 is used to perform graphics processing, scheduler 1110 can be configured to divide a processing workload into approximately equal sized tasks, to better enable distribution of graphics processing operations to multiple clusters 1114A-1114N of processing cluster array 1112. In at least one embodiment, portions of processing cluster array 1112 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1114A-1114N may be stored in buffers to allow intermediate data to be transmitted between clusters 1114A-1114N for further processing.

In at least one embodiment, processing cluster array 1112 can receive processing tasks to be executed via scheduler 1110, which receives commands defining processing tasks from front end 1108. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1110 may be configured to fetch indices corresponding to tasks or may receive indices from front end 1108. In at least one embodiment, front end 1108 can be configured to ensure processing cluster array 1112 is configured to a valid state before a workload specified by incoming command buffers (e.g., batch-buffers, push buffers, etc.) is initiated.

In at least one embodiment, each of one or more instances of parallel processing unit 1102 can couple with a parallel processor memory 1122. In at least one embodiment, parallel processor memory 1122 can be accessed via memory crossbar 1116, which can receive memory requests from processing cluster array 1112 as well as I/O unit 1104. In at least one embodiment, memory crossbar 1116 can access parallel processor memory 1122 via a memory interface 1118. In at least one embodiment, memory interface 1118 can include multiple partition units (e.g., partition unit 1120A, partition unit 1120B, through partition unit 1120N) that can each couple to a portion (e.g., memory unit) of parallel processor memory 1122. In at least one embodiment, a number of partition units 1120A-1120N is configured to be equal to a number of memory units, such that a first partition unit 1120A has a corresponding first memory unit 1124A, a second partition unit 1120B has a corresponding memory unit 1124B, and an N-th partition unit 1120N has a corresponding N-th memory unit 1124N. In at least one embodiment, a number of partition units 1120A-1120N may not be equal to a number of memory units.

In at least one embodiment, memory units 1124A-1124N can include various types of memory devices, including dynamic random access memory (DRAM) or graphics random access memory, such as synchronous graphics random access memory (SGRAM), including graphics double data rate (GDDR) memory. In at least one embodiment, memory units 1124A-1124N may also include 3D stacked memory, including but not limited to high bandwidth memory (HBM). In at least one embodiment, render targets, such as frame buffers or texture maps may be stored across memory units 1124A-1124N, allowing partition units 1120A-1120N to write portions of each render target in parallel to efficiently use available bandwidth of parallel processor memory 1122. In at least one embodiment, a local instance of parallel processor memory 1122 may be excluded in favor of a unified memory design that utilizes system memory in conjunction with local cache memory.

In at least one embodiment, any one of clusters 1114A-1114N of processing cluster array 1112 can process data that will be written to any of memory units 1124A-1124N within parallel processor memory 1122. In at least one embodiment, memory crossbar 1116 can be configured to transfer an output of each cluster 1114A-1114N to any partition unit 1120A-1120N or to another cluster 1114A-1114N, which can perform additional processing operations on an output. In at least one embodiment, each cluster 1114A-1114N can communicate with memory interface 1118 through memory crossbar 1116 to read from or write to various external memory devices. In at least one embodiment, memory crossbar 1116 has a connection to memory interface 1118 to communicate with I/O unit 1104, as well as a connection to a local instance of parallel processor memory 1122, enabling processing units within different processing clusters 1114A-1114N to communicate with system memory or other memory that is not local to parallel processing unit 1102. In at least one embodiment, memory crossbar 1116 can use virtual channels to separate traffic streams between clusters 1114A-1114N and partition units 1120A-1120N.

In at least one embodiment, multiple instances of parallel processing unit 1102 can be provided on a single add-in card, or multiple add-in cards can be interconnected. In at least one embodiment, different instances of parallel processing unit 1102 can be configured to interoperate even if different instances have different numbers of processing cores, different amounts of local parallel processor memory, and/or other configuration differences. For example, in at least one embodiment, some instances of parallel processing unit 1102 can include higher precision floating point units relative to other instances. In at least one embodiment, systems incorporating one or more instances of parallel processing unit 1102 or parallel processor 1100 can be implemented in a variety of configurations and form factors, including but not limited to desktop, laptop, or handheld personal computers, servers, workstations, game consoles, and/or embedded systems.

Figure 11B:
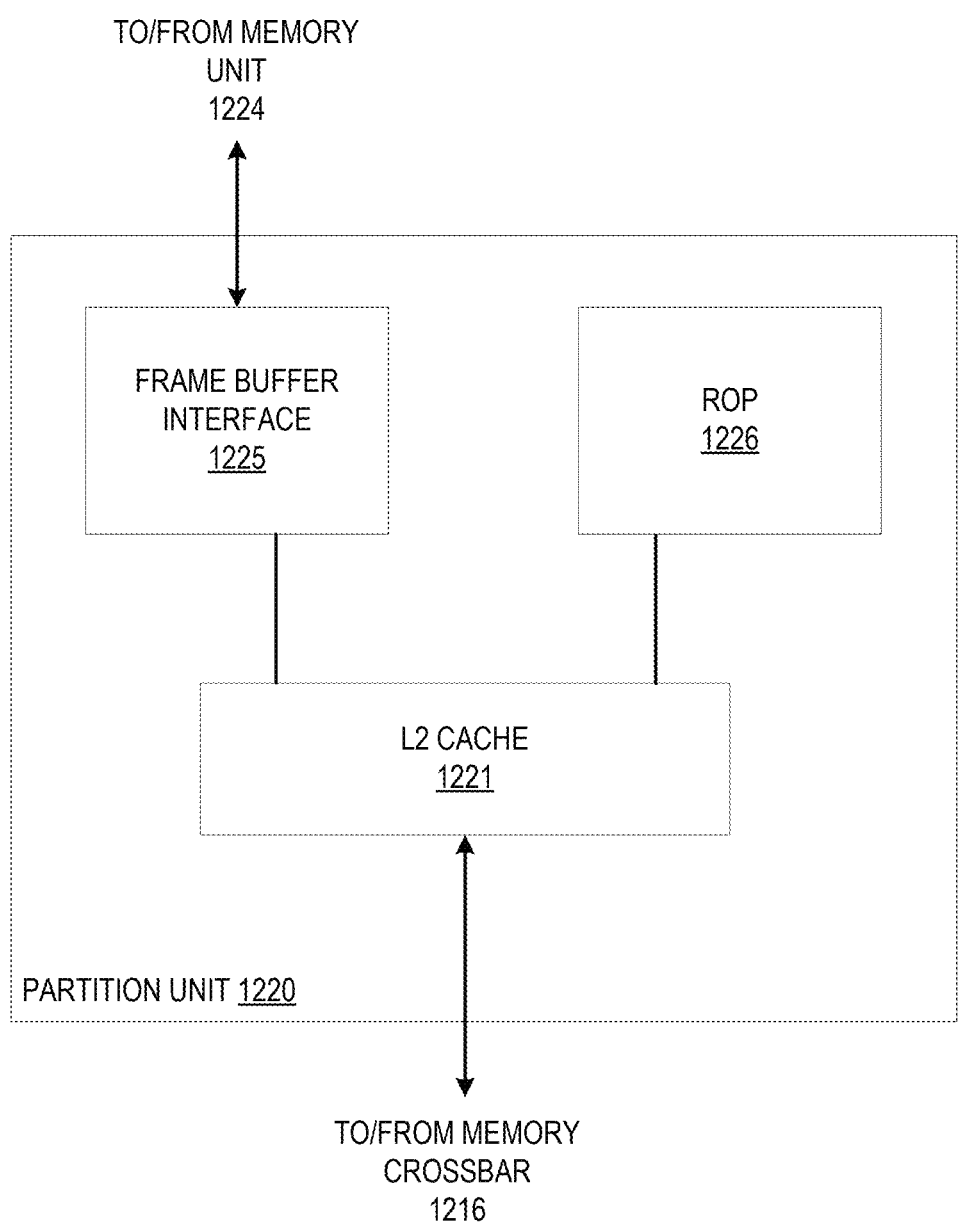
FIG. 11B illustrates a partition unit, in accordance with at least one embodiment of the present disclosure.

FIG. 11B is a block diagram of a partition unit 1120 according to at least one embodiment. In at least one embodiment, partition unit 1120 is an instance of one of partition units 1120A-1120N of FIG. 11A. In at least one embodiment, partition unit 1120 includes an L2 cache 1121, a frame buffer interface 1125, and a ROP 1126 (raster operations unit). In at least one embodiment, L2 cache 1121 is a read/write cache that is configured to perform load and store operations received from memory crossbar 1116 and ROP 1126. In at least one embodiment, read misses and urgent write-back requests are output by L2 cache 1121 to frame buffer interface 1125 for processing. In at least one embodiment, updates can also be sent to a frame buffer via frame buffer interface 1125 for processing. In at least one embodiment, frame buffer interface 1125 interfaces with one of memory units in parallel processor memory, such as memory units 1124A-1124N of FIG. 11 (e.g., within parallel processor memory 1122).

In at least one embodiment, ROP 1126 is a processing unit that performs raster operations such as stencil, z test, blending, etc. In at least one embodiment, ROP 1126 then outputs processed graphics data that is stored in graphics memory. In at least one embodiment, ROP 1126 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1126 can vary based on statistical characteristics of data to be compressed. For example, in at least one embodiment, delta color compression is performed on depth and color data on a per-tile basis.

In at least one embodiment, ROP 1126 is included within each processing cluster (e.g., cluster 1114A-1114N of FIG. 11A) instead of within partition unit 1120. In at least one embodiment, read and write requests for pixel data are transmitted over memory crossbar 1116 instead of pixel fragment data. In at least one embodiment, processed graphics data may be displayed on a display device, such as one of one or more display device(s) 1010 of FIG. 10, routed for further processing by processor(s) 1002, or routed for further processing by one of processing entities within parallel processor 1100 of FIG. 11A.

Figure 11C:
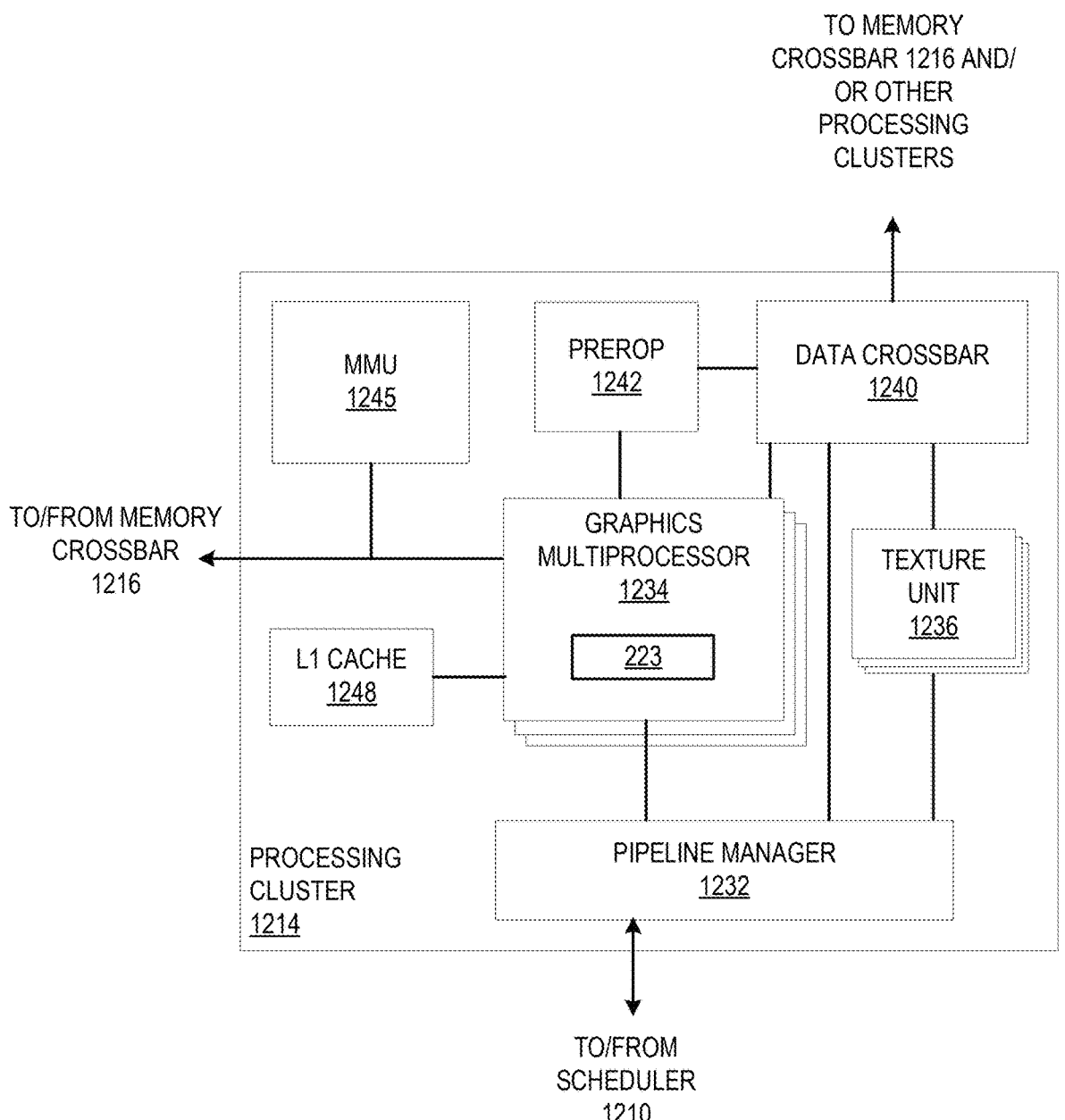
FIG. 11C illustrates a processing cluster, in accordance with at least one embodiment of the present disclosure.

FIG. 11C is a block diagram of a processing cluster 1114 within a parallel processing unit according to at least one embodiment. In at least one embodiment, a processing cluster is an instance of one of processing clusters 1114A-1114N of FIG. 11A. In at least one embodiment, processing cluster 1114 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 1114 can be controlled via a pipeline manager 1132 that distributes processing tasks to SIMT parallel processors. In at least one embodiment, pipeline manager 1132 receives instructions from scheduler 1110 of FIG. 11A and manages execution of those instructions via a graphics multiprocessor 1134 and/or a texture unit 1136. In at least one embodiment, graphics multiprocessor 1134 is an exemplary instance of a SIMT parallel processor. However, in at least one embodiment, various types of SIMT parallel processors of differing architectures may be included within processing cluster 1114. In at least one embodiment, one or more instances of graphics multiprocessor 1134 can be included within a processing cluster 1114. In at least one embodiment, graphics multiprocessor 1134 can process data and a data crossbar 1140 can be used to distribute processed data to one of multiple possible destinations, including other shader units. In at least one embodiment, pipeline manager 1132 can facilitate distribution of processed data by specifying destinations for processed data to be distributed via data crossbar 1140.

In at least one embodiment, each graphics multiprocessor 1134 within processing cluster 1114 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1114 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 1134. In at least one embodiment, a thread group may include fewer threads than a number of processing engines within graphics multiprocessor 1134. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 1134. In at least one embodiment, when a thread group includes more threads than number of processing engines within graphics multiprocessor 1134, processing can be performed over consecutive clock cycles. In at least one embodiment, multiple thread groups can be executed concurrently on a graphics multiprocessor 1134.

In at least one embodiment, graphics multiprocessor 1134 includes an internal cache memory to perform load and store operations. In at least one embodiment, graphics multiprocessor 1134 can forego an internal cache and use a cache memory (e.g., L1 cache 1148) within processing cluster 1114. In at least one embodiment, each graphics multiprocessor 1134 also has access to L2 caches within partition units (e.g., partition units 1120A-1120N of FIG. 11A) that are shared among all processing clusters 1114 and may be used to transfer data between threads. In at least one embodiment, graphics multiprocessor 1134 may also access off-chip global memory, which can include one or more of local parallel processor memory and/or system memory. In at least one embodiment, any memory external to parallel processing unit 1102 may be used as global memory. In at least one embodiment, processing cluster 1114 includes multiple instances of graphics multiprocessor 1134 and can share common instructions and data, which may be stored in L1 cache 1148.

In at least one embodiment, each processing cluster 1114 may include an MMU 1145 (memory management unit) that is configured to map virtual addresses into physical addresses. In at least one embodiment, one or more instances of MMU 1145 may reside within memory interface 1118 of FIG. 11A. In at least one embodiment, MMU 1145 includes a set of page table entries (PTEs) used to map a virtual address to a physical address of a tile and optionally a cache line index. In at least one embodiment, MMU 1145 may include address translation lookaside buffers (TLB) or caches that may reside within graphics multiprocessor 1134, L1 cache 1148, or processing cluster 1114. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 1114 may be configured such that each graphics multiprocessor 1134 is coupled to a texture unit 1136 for performing texture mapping operations, e.g., determining texture sample positions, reading texture data, and filtering texture data. In at least one embodiment, texture data is read from an internal texture L1 cache (not shown) or from an L1 cache within graphics multiprocessor 1134 and is fetched from an L2 cache, local parallel processor memory, or system memory, as needed. In at least one embodiment, each graphics multiprocessor 1134 outputs processed tasks to data crossbar 1140 to provide processed task to another processing cluster 1114 for further processing or to store processed task in an L2 cache, local parallel processor memory, or system memory via memory crossbar 1116. In at least one embodiment, a preROP 1142 (pre-raster operations unit) is configured to receive data from graphics multiprocessor 1134, and direct data to ROP units, which may be located with partition units as described herein (e.g., partition units 1120A-1120N of FIG. 11A). In at least one embodiment, preROP 1142 unit can perform optimizations for color blending, organizing pixel color data, and performing address translations.

Locking logic 223 may be used to perform locking operations associated with one or more embodiments, including atomically updating locking data to implement a RW lock. Details regarding software locking logic 223 are provided herein in conjunction with FIG. 2. In at least one embodiment, locking logic 223 may be used in the system of FIG. 11C for performing locking operations, including atomically updating locking data to implement a RW lock.

Figure 11D:
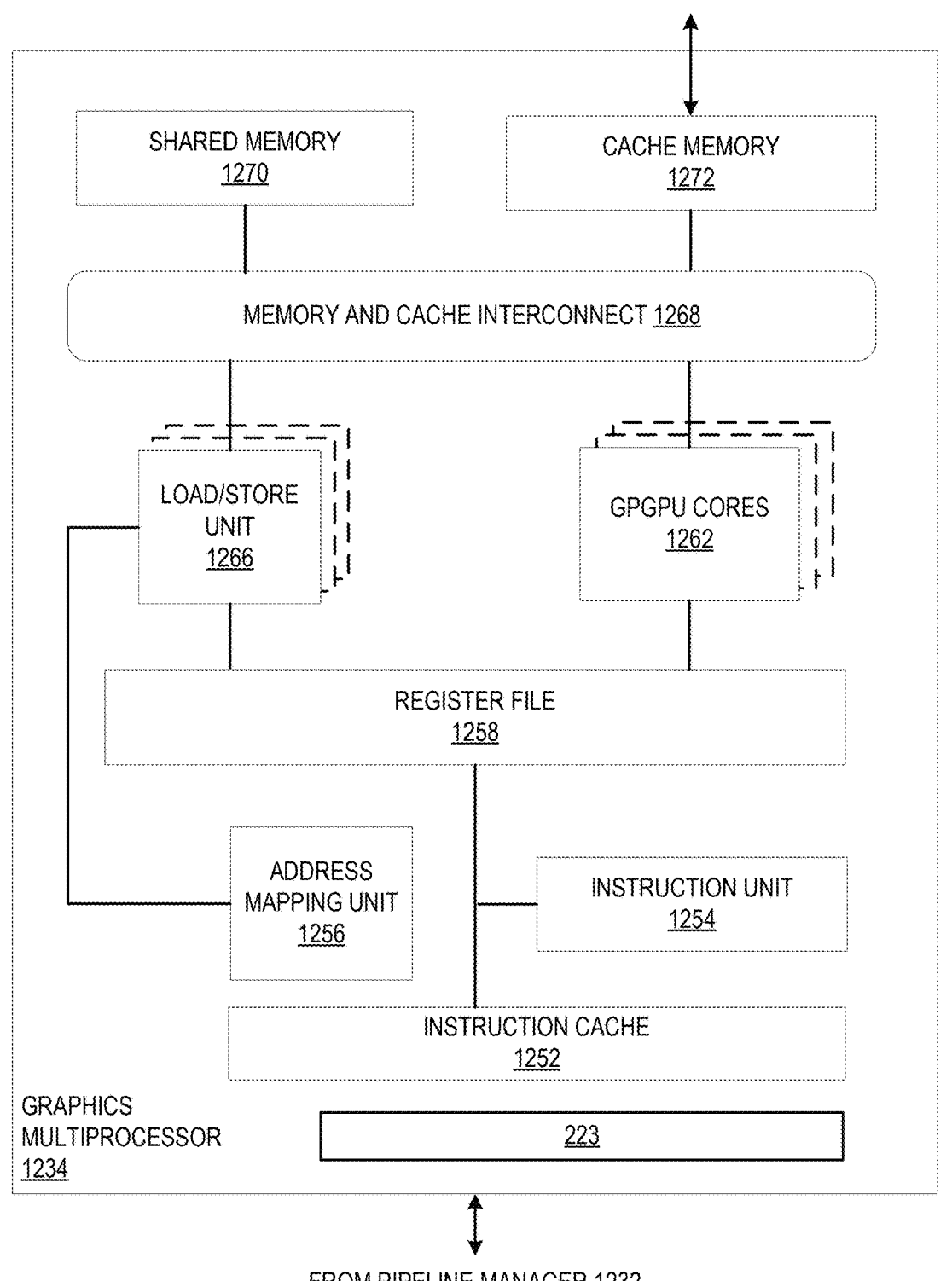
FIG. 11D illustrates a graphics multiprocessor, in accordance with at least one embodiment of the present disclosure.

FIG. 11D shows a graphics multiprocessor 1134 according to at least one embodiment. In at least one embodiment, graphics multiprocessor 1134 couples with pipeline manager 1132 of processing cluster 1114. In at least one embodiment, graphics multiprocessor 1134 has an execution pipeline including but not limited to an instruction cache 1152, an instruction unit 1154, an address mapping unit 1156, a register 1158, one or more general purpose graphics processing unit (GPGPU) cores 1162, and one or more load/store units 1166. In at least one embodiment, GPGPU cores 1162 and load/store units 1166 are coupled with cache memory 1172 and shared memory 1170 via a memory and cache interconnect 1168.

In at least one embodiment, instruction cache 1152 receives a stream of instructions to execute from pipeline manager 1132. In at least one embodiment, instructions are cached in instruction cache 1152 and dispatched for execution by an instruction unit 1154. In at least one embodiment, instruction unit 1154 can dispatch instructions as thread groups (e.g., warps), with each thread of thread group assigned to a different execution unit within GPGPU cores 1162. In at least one embodiment, an instruction can access any of a local, shared, or global address space by specifying an address within a unified address space. In at least one embodiment, address mapping unit 1156 can be used to translate addresses in a unified address space into a distinct memory address that can be accessed by load/store units 1166.

In at least one embodiment, register 1158 provides a set of registers for functional units of graphics multiprocessor 1134. In at least one embodiment, register 1158 provides temporary storage for operands connected to data paths of functional units (e.g., GPGPU cores 1162, load/store units 1166) of graphics multiprocessor 1134. In at least one embodiment, register 1158 is divided between each of functional units such that each functional unit is allocated a dedicated portion of register 1158. In at least one embodiment, register 1158 is divided between different warps being executed by graphics multiprocessor 1134.

In at least one embodiment, GPGPU cores 1162 can each include floating point units (FPUs) and/or integer arithmetic logic units (ALUs) that are used to execute instructions of graphics multiprocessor 1134. In at least one embodiment, GPGPU cores 1162 can be similar in architecture or can differ in architecture. In at least one embodiment, a first portion of GPGPU cores 1162 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 1134 can additionally include one or more fixed function or special function units to perform specific functions such as copy rectangle or pixel blending operations. In at least one embodiment, one or more of GPGPU cores 1162 can also include fixed or special function logic.

In at least one embodiment, GPGPU cores 1162 include SIMD logic capable of performing a single instruction on multiple sets of data. In at least one embodiment, GPGPU cores 1162 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 1168 is an interconnect network that connects each functional unit of graphics multiprocessor 1134 to register 1158 and to shared memory 1170. In at least one embodiment, memory and cache interconnect 1168 is a crossbar interconnect that allows load/store unit 1166 to implement load and store operations between shared memory 1170 and register 1158. In at least one embodiment, register 1158 can operate at a same frequency as GPGPU cores 1162, thus data transfer between GPGPU cores 1162 and register 1158 can have very low latency. In at least one embodiment, shared memory 1170 can be used to enable communication between threads that execute on functional units within graphics multiprocessor 1134. In at least one embodiment, cache memory 1172 can be used as a data cache for example, to cache texture data communicated between functional units and texture unit 1136. In at least one embodiment, shared memory 1170 can also be used as a program managed cache. In at least one embodiment, threads executing on GPGPU cores 1162 can programmatically store data within shared memory in addition to automatically cached data that is stored within cache memory 1172.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Locking logic 223 may be used to perform locking operations associated with one or more embodiments, including atomically updating locking data to implement a RW lock. Details regarding software locking logic 223 are provided herein in conjunction with FIG. 2. In at least one embodiment, locking logic 223 may be used in the system of FIG. 11D for performing locking operations, including atomically updating locking data to implement a RW lock.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

What is claimed is:

1. A method for ensuring thread-safe access to a shared data item in a parallel processing system, the method comprising:

maintaining, by a processing device, locking data comprising i) a first portion indicating whether a write operation is updating a data item or awaiting to update the data item, and ii) a second portion indicating a number of read operations accessing the data item;

receiving a first read operation to read the data item;

repeatedly performing an atomic conditional increment operation until a first locking condition is satisfied, the atomic conditional increment operation comprising, in a single atomic transaction:

determining, using the locking data, that the first locking condition is satisfied, representing that no write operations are updating the data item or awaiting to update the data item; and responsive to the determining that the first locking condition is satisfied:

incrementing the second portion of the locking data to reflect the number of read operations reading the data item; and responsive to the determining that the first locking condition is satisfied, executing the first read operation to read the data item.

2. The method of claim 1, wherein the locking data is an integer comprising a first set of one or more fields and a second set of one or more fields.

3. The method of claim 1, wherein the locking data is an integer, and wherein the first locking condition is satisfied responsive to the integer being less than a specified value.

4. The method of claim 1, further comprising:

receiving a second read operation to read the data item;

determining, using the locking data, that the first locking condition is not satisfied, representing that a write operation is updating the data item or awaiting to update the data item; and responsive to the determining that the first locking condition is not satisfied, delaying execution of the second read operation until the first locking condition is satisfied.

5. The method of claim 1, further comprising:

receiving a request to perform a first write operation to update the data item; and determining whether the locking data satisfies a second locking condition, wherein the second locking condition represents whether any read operations or write operations are accessing the data item.

6. The method of claim 5, further comprising:

determining that the locking data satisfies the second locking condition, indicating that no read operation or write operation is accessing the data item; and responsive to determining that the locking data satisfies the second locking condition:

atomically updating the first portion of the locking data to reflect that the first write operation is updating the data item; and executing the first write operation to update the data item.

7. The method of claim 6, further comprising:

responsive to executing the first write operation to update the data item, atomically updating the first portion of the locking data to reflect that no write operation is updating the data item or awaiting to update the data item.

8. The method of claim 5, further comprising:

determining that the locking data fails to satisfy the second locking condition; and responsive to determining that locking data fails to satisfy the second locking condition, delaying execution of the first write operation until the second locking condition is satisfied.

9. A system for ensuring thread-safe access to a shared data item, the system comprising:

a plurality of processing cores;

a memory coupled to the plurality of processing cores, wherein the memory stores instructions that when executed by one or more of the plurality of processing cores, cause one or more of the plurality of processing cores to:

maintain locking data comprising i) a first portion indicating whether a write operation is updating a data item or awaiting to update the data item, and ii) a second portion indicating a number of read operations accessing the data item;

receive a first read operation to read the data item;

repeatedly perform an atomic conditional increment operation until a first locking condition is satisfied, the atomic conditional increment operation comprising, in a single atomic transaction:

determine, using the locking data, that the first locking condition is satisfied, representing that no write operations are updating the data item or awaiting to update the data item; and responsive to the determination that the first locking condition is satisfied:

increment the second portion of the locking data to reflect the number of read operations reading the data item; and responsive to the determination that the first locking condition is satisfied, execute the first read operation to read the data item.

10. The system of claim 9, wherein the locking data is an integer comprising a first set of one or more fields and a second set of one or more fields.

11. The system of claim 9, wherein the locking data is an integer, and wherein the first locking condition is satisfied responsive to the integer being less than a specified value.

12. The system of claim 9, wherein the one or more of the plurality of processing cores are further to:

receive a second read operation to read the data item;

determine, using the locking data, that the first locking condition is not satisfied, representing that a write operation is updating the data item or awaiting to update the data item; and responsive to the determination that the first locking condition is not satisfied, delay execution of the second read operation until the first locking condition is satisfied.

13. The system of claim 9, wherein the one or more of the plurality of processing cores are further to:

receive a request to perform a first write operation to update the data item; and determine whether the locking data satisfies a second locking condition, wherein the second locking condition represents whether any read operations or write operations are accessing the data item.

14. The system of claim 13, wherein the one or more of the plurality of processing cores are further to:

determine that the locking data satisfies the second locking condition, indicating that no read operation or write operation is accessing the data item; and responsive to the determination that the locking data satisfies the second locking condition:

atomically update the first portion of the locking data to reflect that the first write operation is updating the data item; and execute the first write operation to update the data item.

15. The system of claim 14, wherein the one or more of the plurality of processing cores are further to:

responsive to execution of the first write operation to update the data item, atomically update the first portion of the locking data to reflect that no write operation is updating the data item or awaiting to update the data item.

16. The system of claim 13, wherein the one or more of the plurality of processing cores are further to:

determine that the locking data fails to satisfy the second locking condition; and responsive to the determination that locking data fails to satisfy the second locking condition, delay execution of the first write operation until the second locking condition is satisfied.

17. A non-transitory computer-readable storage medium comprising instructions that, when executed by a processing device, cause the processing device to perform operations comprising:

maintain, by the processing device, locking data comprising i) a first portion indicating whether a write operation is updating a data item or awaiting to update the data item, and ii) a second portion indicating a number of read operations accessing the data item;

receive a first read operation to read the data item;

repeatedly perform an atomic conditional increment operation until a first locking condition is satisfied, the atomic conditional increment operation comprising, in a single atomic transaction:

determine, using the locking data, that the first locking condition is satisfied, representing that no write operations are updating the data item or awaiting to update the data item; and responsive to the determination that the first locking condition is satisfied:

increment the second portion of the locking data to reflect the number of read operations reading the data item; and responsive to the determination that the first locking condition is satisfied, execute the first read operation to read the data item.

18. The non-transitory computer-readable storage medium of claim 17, wherein the locking data is an integer comprising a first set of one or more fields and a second set of one or more fields.

19. The non-transitory computer-readable storage medium of claim 17, wherein the locking data is an integer, and wherein the first locking condition is satisfied responsive to the integer being less than a specified value.

20. The non-transitory computer-readable storage medium of claim 17, wherein the processing device is further to:

receive a second read operation to read the data item;

determine, using the locking data, that the first locking condition is not satisfied, representing that a write operation is updating the data item or awaiting to update the data item; and responsive to the determination that the first locking condition is not satisfied, delay execution of the second read operation until the first locking condition is satisfied.

* * * * *